United States Patent
Gao et al.

(10) Patent No.: US 11,507,533 B2
(45) Date of Patent: Nov. 22, 2022

(54) DATA QUERY METHOD AND APPARATUS

(71) Applicant: Huawei Technologies Co., Ltd., Shenzhen (CN)

(72) Inventors: Xiang Gao, Shenzhen (CN); Wei Du, Shanghai (CN); Chun Yen Chen, Shenzhen (CN); Ning Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 16/967,660

(22) PCT Filed: Feb. 5, 2018

(86) PCT No.: PCT/CN2018/075300
§ 371 (c)(1),
(2) Date: Aug. 5, 2020

(87) PCT Pub. No.: WO2019/148497
PCT Pub. Date: Aug. 8, 2019

(65) Prior Publication Data
US 2021/0224225 A1 Jul. 22, 2021

(51) Int. Cl.
*G06F 16/14* (2019.01)
*G06F 16/17* (2019.01)

(52) U.S. Cl.
CPC ........ *G06F 16/148* (2019.01); *G06F 16/1727* (2019.01)

(58) Field of Classification Search
CPC .... G06F 16/148; G06F 16/1727; G06F 3/064; G06F 3/0643
(Continued)

(56) References Cited

U.S. PATENT DOCUMENTS 4,453,217 A * 6/1984 Boivie ............... H04M 1/2748
707/999.005
5,333,315 A * 7/1994 Saether ................. G11B 27/36
715/255
(Continued)

FOREIGN PATENT DOCUMENTS

CN 101211338 A 7/2008
CN 102024019 A 4/2011
(Continued)

OTHER PUBLICATIONS

Pang Hai-Fei et al.,"Research on Improvement of File Retrieval Method Based on Linux," Fire Control and Command Control, vol. 42 No. 2, total 4 pages (Feb. 2017). With English abstract.
(Continued)

*Primary Examiner* — Phuong Thao Cao
(74) *Attorney, Agent, or Firm* — Leydig, Voit & Mayer, Ltd.

(57) ABSTRACT

A data query method and apparatus are disclosed. The method includes: determining a target directory block including m directory entries and m file names, where the m directory entries one-to-one correspond to the m file names, and the m directory entries and the m file names are sequentially arranged according to a preset rule; determining a current first set and a current second set based on a binary search algorithm and the target directory block; determining a first common prefix between a to-be-accessed file name and a file name in the current second set; comparing the to-be-accessed file name with a third file name character by character from a first character after the first common prefix; and if the to-be-accessed file name is the same as the third file name, obtaining data of a to-be-accessed file based on a directory entry corresponding to the third file name.

17 Claims, 13 Drawing Sheets

(58) Field of Classification Search
USPC .......................................................... 707/822
See application file for complete search history.

(56) References Cited

U.S. PATENT DOCUMENTS

| | | | | |
|---|---|---|---|---|
| 5,371,885 | A * | 12/1994 | Letwin | G06F 16/1794 |
| 5,819,292 | A * | 10/1998 | Hitz | G06F 16/174 |
| | | | | 707/999.203 |
| 5,907,672 | A * | 5/1999 | Matze | G06F 11/1451 |
| | | | | 714/E11.123 |
| 5,963,962 | A * | 10/1999 | Hitz | G06F 11/1435 |
| 6,108,285 | A * | 8/2000 | Freeman | G06F 16/902 |
| 6,973,542 | B1 * | 12/2005 | Schmuck | G06F 12/0862 |
| | | | | 711/137 |
| 7,904,492 | B2 * | 3/2011 | Sarma | G06F 16/128 |
| | | | | 707/812 |
| 8,918,621 | B1 * | 12/2014 | Taylor | G06F 12/0223 |
| | | | | 711/E12.078 |
| 10,614,032 | B2 * | 4/2020 | Pudipeddi | G06F 16/137 |
| 10,909,169 | B2 * | 2/2021 | Hayakawa | G06F 16/583 |
| 2002/0065823 | A1 | 5/2002 | Boulter et al. | |
| 2004/0054858 | A1 * | 3/2004 | Chandrasekaran | G06F 3/0676 |
| | | | | 707/E17.005 |
| 2004/0133573 | A1 * | 7/2004 | Miloushev | G06F 16/10 |
| 2006/0225072 | A1 * | 10/2006 | Lari | G06F 8/71 |
| | | | | 717/169 |
| 2007/0033374 | A1 * | 2/2007 | Sinclair | G06F 12/0246 |
| | | | | 711/E12.008 |
| 2008/0235486 | A1 * | 9/2008 | Sepulveda | G06F 3/0643 |
| | | | | 711/206 |
| 2009/0019047 | A1 * | 1/2009 | Anderson | G06F 16/1774 |
| 2009/0307291 | A1 * | 12/2009 | Ye | G06F 3/0608 |
| 2009/0319478 | A1 | 12/2009 | Proux et al. | |
| 2013/0159250 | A1 | 6/2013 | Marcotte | |
| 2014/0095458 | A1 * | 4/2014 | Kim | G06F 16/2255 |
| | | | | 707/698 |
| 2016/0063008 | A1 * | 3/2016 | Benight | G06F 16/122 |
| | | | | 707/694 |
| 2017/0262172 | A1 * | 9/2017 | Xu | G06F 12/109 |
| 2018/0300355 | A1 * | 10/2018 | Deshpande | G06F 3/0643 |
| 2020/0334169 | A1 * | 10/2020 | Zhang | G06F 12/0882 |

FOREIGN PATENT DOCUMENTS

| | | | |
|---|---|---|---|
| CN | 102385623 B | | 8/2013 |
| CN | 103473337 A | | 12/2013 |
| CN | 103870588 A | | 6/2014 |
| CN | 103942205 A | | 7/2014 |
| CN | 104050251 A | | 9/2014 |
| CN | 104537016 A | | 4/2015 |
| CN | 105701096 A | | 6/2016 |
| EP | 1913480 B1 | | 12/2010 |
| JP | H11161533 A | * | 6/1999 |
| JP | 2000357115 A | * | 12/2000 |
| WO | 2017076184 A1 | | 5/2017 |

OTHER PUBLICATIONS

Wikipedia "Multiplicative binary search," total 2 pages, retrieved from: https://en.wikipedia.org/wiki/Multiplicative_binary_search on Aug. 25, 2020.

Anonymous, "Binary search algorithm—Wikipedia," XP055915225, total 14 pages (Jan. 15, 2018).

EP/18903433.3, Office Action, dated May 2, 2022.

* cited by examiner

PRIOR ART

DATA QUERY METHOD AND APPARATUS

CROSS-REFERENCE TO RELATED APPLICATIONS

This application is a national stage of International Application No. PCT/CN2018/075300, filed on Feb. 5, 2018, which is hereby incorporated by reference in its entirety.

TECHNICAL FIELD

Embodiments of this application relate to the field of computer technologies, and in particular, to a data query method and apparatus.

BACKGROUND

A file system usually organizes a topology relationship of a file in a tree structure. The file relates to only a directory file and a common file. In the tree structure, a leaf node usually represents the common file, and another node other than the leaf node represents the directory file. The directory file includes a plurality of directory entries, and each directory entry includes a file name, a file type, and an index (an inode) number. A computer can obtain data of the file based on an index identified by the index number. When obtaining a file (for example, a file A), the computer needs to query a file name in the directory file, obtain a directory entry corresponding to the file name of the file A, and further obtain data of the file A based on the obtained directory entry.

Currently, structures of directories of some file systems (for example, a flash friendly file system (Flash Friendly File System, F2FS), and a fourth extended filesystem (Fourth Extended File System, EXT4)) are a hash (hash) tree including a multi-level hash table. Each level of hash table includes a plurality of hash values, and file names and file index numbers corresponding to the hash values. Structures of directories of other file systems (such as a new technology file system (New technology file system, Ntfs), and a B-tree file system (B-tree file system, Btrfs)) are an n (n≥1)-order B+ tree.

In an application scenario of a read-only file system, if a structure of a directory of the file system is the hash tree including the multi-level hash table, when obtaining data of a to-be-accessed file, a computer needs to query the hash table level by level, first traverse hash values in each queried hash table, and then matches a file name. In a comparatively high-level hash table, efficiency for querying a to-be-accessed file name is comparatively low, and a large quantity of hash values included in the hash tree results in comparatively low effective utilization of storage space. In addition, the high-level hash table is not fully written in the comparatively high-level hash table, which further reduces the effective utilization of the storage space. If the structure of the directory of the file system is the n-order B+ tree, when a computer obtains data of a to-be-accessed file, the computer sequentially queries from a minimum keyword, or randomly queries from a root node. As a result, efficiency for querying a to-be-accessed file name is comparatively low. In addition, a keyword in a leaf node of the n-order B+ tree is at an intermediate node, which reduces effective utilization of storage space.

In conclusion, in the application scenario of the read-only file system, the existing structure of the directory results in the low efficiency querying the to-be-accessed file name by the computer and the low effective utilization of the storage space of the computer.

SUMMARY

Embodiments of this application provide a data query method and apparatus, to resolve a problem of comparatively low efficiency for querying a to-be-accessed file name by a computer and low effective utilization of storage space of the computer.

To achieve the foregoing objective, the following technical solutions are used in the embodiments of this application.

According to a first aspect, a data query method is provided. The data query method is applied to a read-only file system including n (n≥1) directory blocks. Each directory block includes a directory entry area and a file name area. Specifically, the data query method is as follows: A data query apparatus determines a target directory block from then directory blocks, where a directory entry area of the target directory block includes m directory entries, a file name area of the target directory block includes m file names, the m directory entries one-to-one correspond to the m file names, the m directory entries and the m file names are all sequentially arranged according to a preset rule, the to-be-accessed file name falls within a file name range, the file name range is a range including a first file name of the target directory block and a last file name of the target directory block, and m≥1. After determining the target directory block, the data query apparatus sequentially performs a step A1, a step B1, and a step C1. The step A1 is determining a current first set and a current second set based on a binary search algorithm and the target directory block, where the current first set includes x consecutive file names in the m file names, the current second set includes the x (m≥x≥1) file names, a first file name, and a second file name, the first file name is a file name arranged before and adjacent to a first file name in the x file names, the second file name is a file name arranged after and adjacent to a last file name in the x file names. The step B1 is determining a first common prefix between the to-be-accessed file name and a file name in the current second set. The step C1 is comparing the to-be-accessed file name with a third file name character by character from a first character after the first common prefix, where the third file name is a file name at a first preset location in the current first set. After the step C1 is performed, if the to-be-accessed file name is the same as the third file name, the data query apparatus obtains data of a to-be-accessed file based on a directory entry corresponding to the third file name.

The data query apparatus in this application determines a first common prefix between the to-be-accessed file name and a file name in the current second set. Because the current second set covers the first set, there is also the first common prefix between all file names in the current first set and the to-be-accessed file name. Therefore, the data query apparatus directly compares the to-be-accessed file name with the third file name character by character from the first character after the first common prefix. This effectively improves a rate of querying the to-be-accessed file.

In addition, compared with an existing tree structure of a directory, a structure of the directory in this embodiment of this application stores only a directory entry and a file name, and does not store other information related to the file name or the directory entry. This effectively improves utilization of storage space.

Optionally, in a possible implementation of this application, if the to-be-accessed file name is different from the third file name, the data query apparatus redetermines a first set and a second set based on the binary search algorithm, the current first set, and the current second set, and performs the step B1 and the step C1 based on the redetermined first set and the redetermined second set, until the data of the to-be-accessed file is obtained or that the target directory block does not include the to-be-accessed file name is determined.

With reference to a definition of the binary search algorithm, it can be learned that if the to-be-accessed file name is different from the third file name, the data query apparatus further narrows a query range (to be specific, redetermines the first set), and redetermines the first common prefix.

Optionally, in another possible implementation of this application, the preset rule is the lexicographical order. A method for "if the to-be-accessed file name is different from the third file name, redetermining a first set and a second set based on the binary search algorithm, the current first set, and the current second set" is as follows: If a feature value of the to-be-accessed file name is less than a feature value of the third file name, determining, that the redetermined first set includes all file names in the current first set that are located before the third file name, and that the redetermined second set includes the first file name, all the file names in the current first set that are located before the third file name, and the third file name; or if a feature value of the to-be-accessed file name is greater than a feature value of the third file name, determining, that the redetermined first set includes all file names in the current first set that are located after the third file name, and that the redetermined second set includes the third file name, all the file names in the current first set that are located after the third file name, and the second file name.

Optionally, in another possible implementation of this application, a method for "determining a first common prefix between the to-be-accessed file name and a file name in the current second set" is determining a first prefix shared by the to-be-accessed file name and the first file name; determining a second prefix shared by the to-be-accessed file name and the second file name; and determining one with a shorter length between the first prefix and the second prefix as the first common prefix.

In this embodiment of this application, a file name range including all file names in the current second set is greater than a file name range including all file names in the current first set. Because all file names in each directory block are sequentially arranged according to the preset rule, the data query apparatus determines the first prefix shared by the to-be-accessed file name and the first file name, and determines the second prefix shared by the to-be-accessed file name and the second file name to determine the one with a shorter length between the first prefix and the second prefix as the first common prefix.

Optionally, in another possible implementation of this application, a method for determining a target directory block from the n directory blocks by a data query apparatus is as follows: The data query apparatus sequentially performs steps A2, B2, and C2. A step A2 is determining a current third set and a current fourth set based on the binary search algorithm and the n directory blocks, where the current third set includes p file names, the p file names include file names at a second preset location in each of p directory blocks, the file names in the current third set are sequentially arranged according to the preset rule, the p directory blocks are consecutive directory blocks in the n directory blocks, the current fourth set includes the p file names, a fourth file name, and a fifth file name, the fourth file name is a file name arranged before and adjacent to a first file name in the p file names, the fifth file name is a file name arranged after and adjacent to a last file name in the p file names; and 1≤p≤n. A step B2 is determining a second common prefix between the to-be-accessed file name and a file name in the current fourth set. A step C2 is comparing the to-be-accessed file name with a sixth file name character by character from a first character after the second common prefix, where the sixth file name is a file name at a third preset location in the current third set. After the step C2 is performed, if the to-be-accessed file name is the same as the sixth file name, the data query apparatus determines a directory block to which the sixth file name belongs as the target directory block.

When the n directory blocks are stored sequentially one by one, a method for determining the target directory block by the data query apparatus is similar to the method for querying the to-be-accessed file name by the data query apparatus.

Optionally, in another possible implementation of this application, when the to-be-accessed file name is different from the sixth file name, and when 2≤p≤n, the data query apparatus redetermines a third set and a fourth set based on the current third set, the current fourth set, and the binary search algorithm, and perform the step B2 and the step C2 based on the redetermined third set and the redetermined fourth set; or when p=1, the data query apparatus determines the target directory block based on a file name included in the current third set.

Optionally, in another possible implementation of this application, the preset rule is the lexicographical order. For each directory block, when the file name at the second preset location is a first file name of the directory block, a method for "when p=1, the data query apparatus determines the target directory block based on a file name included in the current third set" is as follows: if the feature value of the to-be-accessed file name is greater than a feature value of the file name in the current third set, the data query apparatus determines a directory block to which the file name in the current third set belongs as the target directory block; or if the feature value of the to-be-accessed file name is less than a feature value of the file name in the current third set, the data query apparatus determines a directory block to which a file name located before and adjacent to the file name in the current third set belongs as the target directory block.

Optionally, in another possible implementation of this application, when the preset rule is the lexicographical order, the method for "redetermining a third set and a fourth set based on the current third set, the current fourth set, and the binary search algorithm" is as follows: if the feature value of the to-be-accessed file name is less than a feature value of the sixth file name, determining, that the redetermined third set includes all file names in the current third set that are located before the sixth file name, and that the redetermined fourth set includes the fourth file name, all the file names in the current third set that are located before the sixth file name, and the sixth file name; or if the feature value of the to-be-accessed file name is greater than a feature value of the sixth file name, determining, that the redetermined third set includes all file names in the current third set that are located after the sixth file name, and that the redetermined fourth set includes the sixth file name, all the file names in the current third set that are located after the sixth file name, and the fifth file name.

Optionally, in another possible implementation of this application, the preset rule is the lexicographical order. For each directory block, when the file name at the second preset location is a first file name of the directory block, if the sixth file name is a first file name in the current third set, and the feature value of the to-be-accessed file name is less than a feature value of the sixth file name, the data query apparatus determines a directory block to which a file name located before and adjacent to the sixth file name belongs as the target directory block; or if the sixth file name is a last file name in the current third set, and the feature value of the to-be-accessed file name is greater than a feature value of the sixth file name, the data query apparatus determines a directory block to which the sixth file name belongs as the target directory block.

Optionally, in another possible implementation of this application, a method for "determining a second common prefix between the to-be-accessed file name and a file name in the current fourth set" is determining a third prefix shared by the to-be-accessed file name and the fourth file name; determining a fourth prefix shared by the to-be-accessed file name and the fifth file name; and determining one with a shorter length between the third prefix and the fourth prefix as the second common prefix.

Optionally, in another possible implementation of this application, in a scenario in which the n directory blocks are sequentially arranged according to the preset rule, and stored in a complete binary tree manner, a method for determining a target directory block from the n directory blocks by the data query apparatus is as follows: The data query apparatus sequentially performs a step A3 and a step B3. The step A3 is determining a current candidate directory block and a current third common prefix. The step B3 is comparing the to-be-accessed file name with an $i^{th}$ file name character by character from a first character after the current third common prefix, where the $i^{th}$ file name is a file name at a fourth preset location in an $i^{th}$ directory block in the n directory blocks, and $0 \le i < n$. After performing the step B3, if the to-be-accessed file name is the same as the $i^{th}$ file name, the data query apparatus redetermines the candidate directory block as a directory block to which the $i^{th}$ file name belongs, and determines the redetermined candidate directory block as the target directory block.

Optionally, in another possible implementation of this application, if the to-be-accessed file name is different from the $i^{th}$ file name, the data query apparatus redetermines the third common prefix, the candidate directory block, and the $i^{th}$ file name, where the redetermined $i^{th}$ file name is a file name at the fourth preset location in a $j^{th}$ directory block in the n directory blocks. If the feature value of the to-be-accessed file name is greater than a feature value of the $i^{th}$ file name, $j=2i+2$; or if the feature value of the to-be-accessed file name is less than a feature value of the $i^{th}$ file name, $j=2i+1$, and $0 \le i < j < n$. The data query apparatus re-performs the step B3 based on the redetermined third common prefix, the redetermined candidate directory block, and the redetermined $i^{th}$ file name, until the target directory block is determined.

Optionally, in another possible implementation of this application, the order of the preset rule is the lexicographical order. When the file name at the fourth preset location is a first file name in a corresponding directory block, a method for "redetermining the candidate directory block if the to-be-accessed file name is different from the $i^{th}$ file name" is as follows: if the feature value of the to-be-accessed file name is greater than the feature value of the $i^{th}$ file name, determining that the redetermined candidate directory block is the directory block to which the $i^{th}$ file name belongs; or if the feature value of the to-be-accessed file name is less than the feature value of the $i^{th}$ file name, determining that the redetermined candidate directory block is the current candidate directory block.

Optionally, in another possible implementation of this application, the order of the preset rule is the lexicographical order. When the file name at the fourth preset location is the first file name in the corresponding directory block, a method for "redetermining the third common prefix if the to-be-accessed file name is different from the $i^{th}$ file name" is as follows: When the feature value of the to-be-accessed file name is greater than the feature value of the $i^{th}$ file name, updating a current first target prefix to a prefix shared by the to-be-accessed file name and the $i^{th}$ file name, and determining one with a shorter length between the updated first target prefix and a current second target prefix as the redetermined third common prefix; or when the feature value of the to-be-accessed file name is less than the feature value of the $i^{th}$ file name, updating a current second target prefix to a prefix shared by the to-be-accessed file name and the $i^{th}$ file name, and determining one with a shorter length between a current first target prefix and the updated second target prefix as the redetermined third common prefix. Initial values of both a length of the first target prefix and a length of the second target prefix are zero, and the length of the first target prefix and the length of the second target prefix change with a value relationship between the feature value of the to-be-accessed file name and the feature value of the $i^{th}$ file name.

According to a second aspect, a read-only file system is provided. An object of the read-only file system includes a directory file. The directory file includes n directory blocks. Each directory block includes a directory entry area and a file name area. The directory entry area includes at least one directory entry. The file name area includes at least one file name. For a same directory block, a quantity of directory entries and a quantity of file names in the directory block are the same, and all directory entries and all file names in the directory block are sequentially arranged according to a preset rule.

Optionally, in a possible implementation of this application, each of the at least one directory entry includes an index number, a file type, and an offset of a file name corresponding to the directory entry in a directory block to which the file name belongs. The file name area is adjacent to and located after the directory entry area.

According to a third aspect, a data query apparatus is provided. The data query apparatus has the read-only file system according to any one of the second aspect or possible implementation of the second aspect. The data query apparatus includes a processing unit and an obtaining unit.

Specifically, the processing unit is configured to determine a target directory block from the n directory blocks in the read-only file system. A directory entry area of the target directory block includes m directory entries. A file name area of the target directory block includes m file names. The m directory entries one-to-one correspond to the m file names. The m directory entries and the m file names are all sequentially arranged according to a preset rule. The to-be-accessed file name falls within a file name range. The file name range is a range including a first file name of the target directory block and a last file name of the target directory block, and $m \ge 1$. The processing unit is further configured to perform a step A1, a step B1, and a step C1. The Step A1 is determining a current first set and a current second set based on a binary search algorithm and the target directory block.

The current first set includes x consecutive file names in the m file names. The current second set includes the x file names, a first file name, and a second file name. The first file name is a file name arranged before and adjacent to a first file name in the x file names. The second file name is a file name arranged after and adjacent to a last file name in the x file names; where m≥x≥1. The step B1 is determining a first common prefix between the to-be-accessed file name and a file name in the current second set. The step C1 is comparing the to-be-accessed file name with a third file name character by character from a first character after the first common prefix. The third file name is a file name at a first preset location in the current first set. The obtaining unit is configured to: if the processing unit determines that the to-be-accessed file name is the same as the third file name, obtain data of a to-be-accessed file based on a directory entry corresponding to the third file name.

Optionally, in a possible implementation of this application, the processing unit is further configured to: if the to-be-accessed file name is different from the third file name, redetermine a first set and a second set based on the binary search algorithm, the current first set, and the current second set, and perform the step B1 and the step C1 based on the redetermined first set and the redetermined second set, until the obtaining unit obtains the data of the to-be-accessed file or the processing unit determines that the target directory block does not include the to-be-accessed file name.

Optionally, in another possible implementation of this application, the preset rule is a lexicographical order. The processing unit is specifically configured to: if a feature value of the to-be-accessed file name is less than a feature value of the third file name, determine, that the redetermined first set includes all file names in the current first set that are located before the third file name, and that the redetermined second set includes the first file name, all the file names in the current first set that are located before the third file name, and the third file name; or if a feature value of the to-be-accessed file name is greater than a feature value of the third file name, determine, that the redetermined first set includes all file names in the current first set that are located after the third file name, and that the redetermined second set includes the third file name, all the file names in the current first set that are located after the third file name, and the second file name.

Optionally, in another possible implementation of this application, the processing unit is specifically configured to: determine a first prefix shared by the to-be-accessed file name and the first file name; determine a second prefix shared by the to-be-accessed file name and the second file name; and determine one with a shorter length between the first prefix and the second prefix as the first common prefix.

Optionally, in another possible implementation of this application, the processing unit is further configured to perform a step A2, a step B2, and a step C2. The step A2 is determining a current third set and a current fourth set based on the binary search algorithm and the n directory blocks. The current third set includes p file names. The p file names include file names at a second preset location in each of p directory blocks. File names in the current third set are sequentially arranged according to the preset rule. The p directory blocks are consecutive directory blocks in the n directory blocks. The current fourth set includes the p file names, a fourth file name, and a fifth file name. The fourth file name is a file name arranged before and adjacent to a first file name in the p file names. The fifth file name is a file name arranged after and adjacent to a last file name in the p file names, where 1≤p≤n. The step B2 is determining a second common prefix between the to-be-accessed file name and a file name in the current fourth set. The step C2 is comparing the to-be-accessed file name with a sixth file name character by character from a first character after the second common prefix. The sixth file name is a file name at a third preset location in the current third set. The processing unit is further configured to: if the to-be-accessed file name is the same as the sixth file name, determine a directory block to which the sixth file name belongs as the target directory block.

Optionally, in another possible implementation of this application, the processing unit is specifically configured to: when 2≤p≤n, redetermine a third set and a fourth set based on the current third set, the current fourth set, and the binary search algorithm, and perform the step B2 and the step C2 based on the redetermined third set and the redetermined fourth set; or when p=1, determine the target directory block based on a file name included in the current third set.

Optionally, in another possible implementation of this application, the preset rule is the lexicographical order. For each directory block, the file name at the second preset location is a first file name of the directory block. When p=1, the processing unit is specifically configured to: if the feature value of the to-be-accessed file name is greater than a feature value of the file name in the current third set, determine a directory block to which the file name in the current third set belongs as the target directory block; or if the feature value of the to-be-accessed file name is less than a feature value of the file name in the current third set, determine a directory block to which a file name located before and adjacent to the file name in the current third set belongs as the target directory block.

Optionally, in another possible implementation of this application, the preset rule is the lexicographical order. The processing unit is specifically configured to: if the feature value of the to-be-accessed file name is less than a feature value of the sixth file name, determine, that the redetermined third set includes all file names in the current third set that are located before the sixth file name, and that the redetermined fourth set includes the fourth file name, all the file names in the current third set that are located before the sixth file name, and the sixth file name; or if the feature value of the to-be-accessed file name is greater than a feature value of the sixth file name, determine, that the redetermined third set includes all file names in the current third set that are located after the sixth file name, and that the redetermined fourth set includes the sixth file name, all the file names in the current third set that are located after the sixth file name, and the fifth file name.

Optionally, in another possible implementation of this application, the preset rule is the lexicographical order. For each directory block, the file name at the second preset location is a first file name of the directory block. The processing unit is further configured to: if the sixth file name is a first file name in the current third set, and the feature value of the to-be-accessed file name is less than a feature value of the sixth file name, determine a directory block to which a file name located before and adjacent to the sixth file name belongs as the target directory block; or if the sixth file name is a last file name in the current third set, and the feature value of the to-be-accessed file name is greater than a feature value of the sixth file name, determine a directory block to which the sixth file name belongs as the target directory block.

Optionally, in another possible implementation of this application, the processing unit is specifically configured to: determine a third prefix shared by the to-be-accessed file name and the fourth file name; determine a fourth prefix shared by the to-be-accessed file name and the fifth file name; and determine one with a shorter length between the third prefix and the fourth prefix as the second common prefix.

Optionally, in another possible implementation of this application, the n directory blocks are sequentially arranged according to the preset rule, and stored in a complete binary tree manner. Correspondingly, the processing unit is further configured to perform a step A3 and a step B3. The step A3 is determining a current candidate directory block and a current third common prefix. The step B3 is comparing the to-be-accessed file name with an $i^{th}$ file name character by character from a first character after the current third common prefix. The $i^{th}$ file name is a file name at a fourth preset location in an $i^{th}$ directory block in the n directory blocks, where $0 \le i < n$. The processing unit is further configured to: if the to-be-accessed file name is the same as the $i^{th}$ file name, redetermine the candidate directory block as a directory block to which the $i^{th}$ file name belongs, and determine the redetermined candidate directory block as the target directory block.

Optionally, in another possible implementation of this application, the processing unit is further configured to: if the to-be-accessed file name is different from the $i^{th}$ file name, redetermine the third common prefix, the candidate directory block, and the $i^{th}$ file name. The redetermined $i^{th}$ file name is a file name at the fourth preset location in a $j^{th}$ directory block in the n directory blocks. If the feature value of the to-be-accessed file name is greater than a feature value of the $i^{th}$ file name, $j=2i+2$; or if the feature value of the to-be-accessed file name is less than a feature value of the $i^{th}$ file name, $j=2i+1$, and $0 \le i < j < n$. The processing unit is further configured to re-perform the step B3 based on the redetermined third common prefix, the redetermined candidate directory block, and the redetermined $i^{th}$ file name until the target directory block is determined.

Optional, in another possible implementation of this application, the order of the preset rule is the lexicographical order. The file name at the fourth preset location is a first file name in a corresponding directory block. Correspondingly, the processing unit is specifically configured to: if the feature value of the to-be-accessed file name is greater than the feature value of the $i^{th}$ file name, determine that the redetermined candidate directory block is the directory block to which the $i^{th}$ file name belongs; or if the feature value of the to-be-accessed file name is less than the feature value of the $i^{th}$ file name, determine that the redetermined candidate directory block is the current candidate directory block.

Optional, in another possible implementation of this application, the order of the preset rule is the lexicographical order. The file name at the fourth preset location is the first file name in the corresponding directory block. Correspondingly, the processing unit is specifically configured to: when the feature value of the to-be-accessed file name is greater than the feature value of the $i^{th}$ file name, update a current first target prefix to a prefix shared by the to-be-accessed file name and the $i^{th}$ file name, and determine one with a shorter length between the updated first target prefix and a current second target prefix as the redetermined third common prefix; or when the feature value of the to-be-accessed file name is less than the feature value of the $i^{th}$ file name, update a current second target prefix to a prefix shared by the to-be-accessed file name and the $i^{th}$ file name, and determine one with a shorter length between a current first target prefix and the updated second target prefix as the redetermined third common prefix. Initial values of both a length of the first target prefix and a length of the second target prefix are zero, and the length of the first target prefix and the length of the second target prefix change with a value relationship between the feature value of the to-be-accessed file name and the feature value of the $i^{th}$ file name.

According to a fourth aspect, a terminal is provided. The terminal includes one or more processors, a memory, and a communications interface. The memory and the communications interface are coupled to the one or more processors. The memory is configured to store computer program code, and the computer program code includes an instruction. When the one or more processors execute the instruction, the terminal performs the data query method according to any one of the first aspect and the possible implementations of the first aspect.

According to a fifth aspect, a computer-readable storage medium is provided. The computer-readable storage medium stores an instruction. When the instruction is run on the terminal according to the fourth aspect, the terminal is enabled to perform the data query method according to any one of the first aspect and the possible implementations of the first aspect.

According to a sixth aspect, a computer program product including an instruction is provided. When the computer program product runs on the terminal according to the fourth aspect, the terminal is enabled to perform the data query method according to any one of the first aspect and the possible implementations of the first aspect.

In this application, a name of the data query apparatus does not constitute any limitation to devices or function modules. In an actual implementation, these devices or function modules may have other names. Each device or function module falls within the scope defined by the claims and their equivalent technologies in this application, provided that a function of the device or function module is similar to that described in this application.

For detailed descriptions of the second aspect to the sixth aspect and various implementations thereof in this application, refer to detailed descriptions of the first aspect and the various implementations thereof. In addition, for beneficial effects of the second aspect to the sixth aspect and the various implementations thereof, refer to the analysis of beneficial effects of the first aspect and the various implementations thereof. Details are not described herein again.

These aspects or another aspect in this application is more concise and comprehensible in the following description.

DESCRIPTION OF EMBODIMENTS

In the specification, claims, and accompanying drawings of this application, the terms "first", "second", "third", and the like are intended to distinguish between different objects but not to limit a particular order.

In embodiments of this application, the words "example", "for example", or the like, are used to represent giving an example, an illustration, or a description. Any embodiment or design scheme described as "for example" or "example" in the embodiments of this application should not be interpreted as being preferable or having more advantages than another embodiment or design scheme. Exactly, use of the word "example", "for example", or the like is intended to present a related concept in a specific manner.

For ease of understanding the embodiments of this application, related elements in the embodiments of this application are first explained.

Binary search is also referred to as half-interval search. Its basic idea is querying data x in m elements (such as A1, A2, . . . , and Am) arranged in ascending order and comparing $A\lfloor(1+m)/2\rfloor$ with x. If $A\lfloor(1+m)/2\rfloor$ equals to x, the query ends; if x is less than $A\lfloor(1+m)/2\rfloor$, all elements less than $A\lfloor(1+m)/2\rfloor$ are further queried until an element equal to x is found; or if x is greater than $A\lfloor(1+m)/2\rfloor$, all elements greater than $A\lfloor(1+m)/2\rfloor$ are further queried until an element equal to x is found, where $\lfloor \cdot \rfloor$ is used to represent rounding down.

Figure 1:
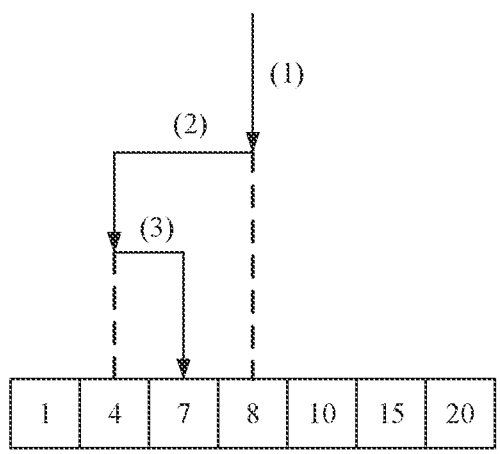
FIG. 1 is a schematic diagram of a query procedure by using a binary search algorithm.

For example, as shown in FIG. 1, seven values (1, 4, 7, 8, 10, 15, 20) are arranged in the ascending order. If a to-be-queried value is "7", a query process is as follows:

(1) Compare a $\lfloor(1+7)/2\rfloor^{th}$ value "8" in (1, 4, 7, 8, 10, 15, 20) with "7". Because "7" is less than "8", continue to query all values (1, 4, 7) that are less than "8".

(2) Compare a $\lfloor(1+3)/2\rfloor^{th}$ value "4" in (1, 4, 7) with "7". Because "7" is greater than "4", continue to query a value (7) that is greater than "4".

(3) If the value "7" in (7) equals to the to-be-queried "7", the query ends.

The embodiments of this application are used to query a file name. Therefore, the m elements in the embodiments of this application are m file names. Sizes of different file names may be determined by feature values of the file names (for example, an arrangement order of a file name after the file names are arranged in a lexicographical order).

With a structured data storage and organization form, a file system organizes a topology relationship of a file in a tree structure, to provide convenience for a user to gain access to and query the file. To manage a sub-file and a sub-directory in a directory, a directory file needs to store names and index (inode) numbers of all the sub-files in the directory. A file name is visible to the user, and the user manages and gains access to the file by using the file name. The inode includes basic information (such as a file size, file creation time, and file modification time) of the file and a plurality of pieces of pointer information pointing to each data block that stores data of the file. A computer can obtain a corresponding inode based on the inode number. When an application program needs to read a file, the application program may determine, based on pointer information included in an inode of the file, each data block storing data of the file, and then obtain, from the determined data block, the data of the file. The file system records a file name and the file index number. Therefore, in an application scenario of the file system, the user can gain access to the data of the file just remembering a directory and the file name to which the file belongs, without caring about that the data of the file is stored on which blocks.

Storage space provided by a storage medium usually includes a plurality of partitions (partition), and the plurality of partitions are all mounted to one or more file systems. Data of each file is stored in a partition of the storage medium. Each partition of the storage medium is divided into a plurality of blocks (block). For a same file system, each block has a same size. Typically, a size of each block is 1024 bytes (byte) or 4096 bytes. For ease of description, in the embodiments of this application, a block storing data of the directory file is referred to as a directory block, and a block storing data of another type of file is referred to as a data block.

Figure 2:
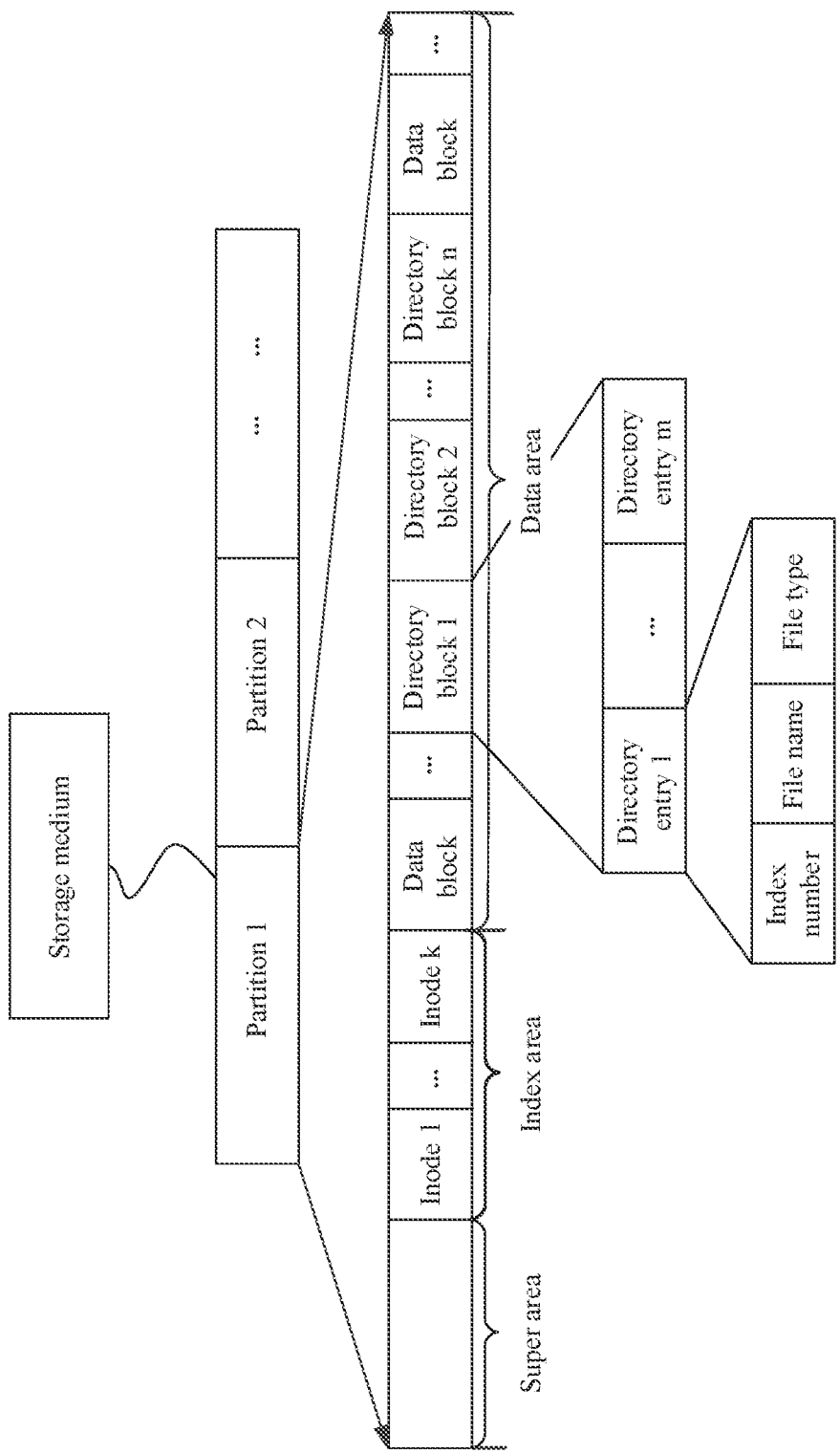
FIG. 2 is a schematic diagram of a partition structure in a Linux operating system in the prior art.

As shown in FIG. 2, in a Linux operating system, each partition of a storage medium includes a super area (Super block), an index area, and a data area. The super area stores information related to a file system, for example, information such as a type of the file system, a quantity of blocks, and a size of a block. The index area includes k (k≥1) inodes, and each inode includes basic information (such as a file size, a file creation time, and a file modification time) of a file and a plurality of pieces of pointer information pointing to each data block that stores data of the file. The data area includes data of both a common file and a directory file. The directory file includes n (n≥1) directory blocks. Each directory block includes a plurality of directory entries. One directory entry corresponds to one file, and each directory entry includes an index (inode) number of one file, a file name of the file, and a file type of the file.

Currently, structures of directories of some file systems (for example, an F2FS file system, and an EXT4 file system) are a hash tree including a multi-level hash table. Each level of hash table includes a plurality of hash values, file names and file index numbers corresponding to the hash values.

The F2FS file system is used as an example. The structure of the directory of the F2FS file system is the hash tree including the multi-level hash table. Each level has a hash table using a hash bucket (bucket) with a private number. Each hash bucket is a directory entry array, and each directory entry in the hash bucket includes a hash value, and a file name and a file index number corresponding to the hash value. Table 1 shows the structure of the directory of the F2FS file system. The structure is a hash tree including an N-level hash table. In Table 1, A represents a bucket, B represents a directory block, N represents a maximum hash level, A (2B) represents that one hash bucket includes two directory blocks, and A (4B) represents that one hash bucket includes four directory blocks.

TABLE 1

| Level 0 | A (2B) |
|---|---|
| Level 1 | A (2B) - A (2B) |
| Level 2 | A (2B) - A (2B) - A (2B) - A (2B) |
| ... | ... |
| Level N/2 | A (2B) - A (2B) - A (2B) - ... A (2B) |
| Level N/2 + 1 | A (4B) - A (4B) - A (4B) - ... A (4B) |
| ... | ... |
| Level N | A (4B) - A (4B) - A (4B) - A (4B) - ... A (4B) |

With reference to Table 1, it can be learned that in the structure of the directory of the F2FS file system, each hash bucket in each level of hash table from a 0-level hash table to an N/2-level hash table includes two directory blocks, and each hash bucket in each level of hash table from an (N/2+1)-level hash table to an N-level hash table includes four directory blocks. An i (i<N/2)-level hash table includes $2^i$ hash buckets, and a j (j≥N/2)-level hash table includes $2^{(N/2-1)}$ hash buckets.

Figure 3:
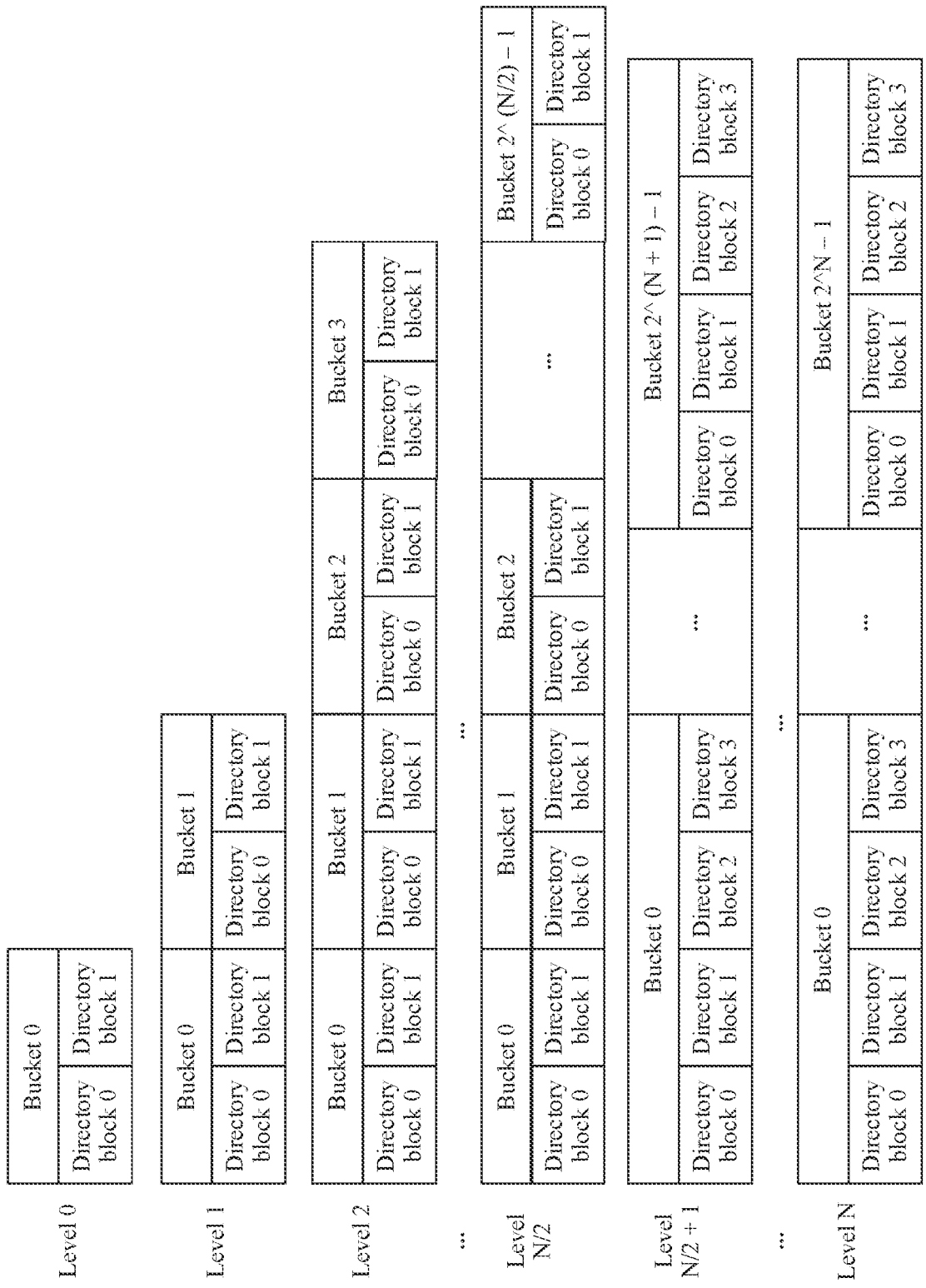
FIG. 3 is a schematic diagram of a structure of a directory of an F2FS file system.

FIG. 3 shows the hash tree shown in Table 1. The 0-level hash table includes one hash bucket: bucket 0, and the bucket 0 includes two directory blocks: a directory block 0 and a directory block 1. Content of another level of hash table is similar to that of the 0-level hash table and a 1-level hash table. Details are not described herein.

Based on the structure of the hash tree, when querying a to-be-accessed file name in the directory of the F2FS file system, a computer first calculates a hash value of the to-be-accessed file name, then scans the hash value in the 0-level hash table, and searches for a directory entry including the to-be-accessed file name and an index number of the to-be-accessed file. If the directory entry is not found, the computer scans in the 1-level hash table. In other words, if the computer does not find, in a previous level of hash table, the directory entry including the to-be-accessed file, the computer scans in a next level of hash table incrementally. In each level of hash table, the computer needs to scan only one hash bucket. A number of the hash bucket is a remainder obtained by dividing the hash value of the to-be-accessed file name by a quantity of hash buckets in the level.

In an application scenario of the read-only F2FS file system, when a computer queries a to-be-accessed file name, the computer needs to perform linear search on the directory entry. When a level of the hash table is comparatively high and a quantity of directory entries is comparatively large, the computer needs to search for a plurality of directory blocks. As a result, query efficiency is comparatively low.

In addition, a large quantity of hash values included in the hash tree result in comparatively low effective utilization of storage space. As a level increases, a quantity of hash buckets in a high-level hash table increases adaptively. Therefore, the high-level hash table is possibly not fully written, which further reduces the effective utilization of the storage space.

In addition to the structure of the hash tree for the directory, structures of some other file systems (such as an Ntfs file system and a Btrfs file system) are an n (n≥1)-order B+ tree.

The n-order B+ tree is an n-order search tree. A B+ tree includes a root node, an internal node, and a leaf node. The root node may be a leaf node, or may be a node including at least two sub-nodes. All nodes of the n-order B+ tree include n keywords. Each keyword does not store data and is used only for indexing. All data is stored on the leaf node. All leaf nodes of the n-order B+ tree include information about all keywords and pointer information pointing to these keywords, and the leaf nodes are linked in ascending order of a size of the keywords.

In the n-order B+ tree, when a computer queries a to-be-accessed file name in the directory, the computer sequentially queries from a minimum keyword, or randomly queries from the root node. As a result, query efficiency is comparatively low.

In addition, the keyword in the leaf node of the n-order B+ tree is at an intermediate node. This structure reduces effective utilization of the storage space.

Based on the problem of the low query efficiency and the low effective utilization of the storage space of the computer, an embodiment of this application provides a data query method. The method is applied to a read-only file system including n (n≥1) directory blocks. Each directory block includes a directory entry area and a file name area. The directory entry area includes at least one directory entry. The file name area includes at least one file name. A quantity of directory entries is the same as a quantity of file names in a same directory block. All directory entries and all file names are sequentially arranged according to a preset rule in the same directory block. Quantities of directory entries in different directory blocks may be the same, or may be different. For example, a file name area of a target directory block in the n directory blocks includes m (m≥1) file names. A directory entry area of the target directory block includes m directory entries. The m file names one-to-one correspond the m directory entries. The m directory entries and the m file names are all sequentially arranged according to the preset rule.

After a data query apparatus in this embodiment of this application determines that a to-be-accessed file name falls within a file name range including the m file names of the target directory block, namely, after the data query apparatus determines the target directory block, the data query apparatus determines, based on a binary search algorithm and the target directory block, a current first set including x consecutive file names in the m file names and a current second set including the x file names, a first file name, and a second file name. The data query apparatus also determines a first common prefix between the to-be-accessed file name and a file name in the current second set. The data query apparatus compares the to-be-accessed file name with a file name at a first preset location in the current first set (namely, a third file name) character by character from a first character after the first common prefix. When the to-be-accessed file name is the same as the third file name, the data query apparatus obtains data of a to-be-accessed file based on a directory entry corresponding to the third file name. The data query apparatus determines the first common prefix between the to-be-accessed file name and the file name in the current second set. Because the current second set covers the first set, there is also the first common prefix between all file names in the current first set and the to-be-accessed file name. Therefore, the data query apparatus directly compares the to-be-accessed file name with the third file name character by character from the first character after the first common prefix. This effectively improves a rate of querying the to-be-accessed file. In addition, compared with the existing tree structure of the directory, the structure of the directory in this embodiment of this application stores only a directory entry and a file name, and does not store other information related to the file name or the directory entry. This effectively improves utilization of the storage space.

Figure 4:
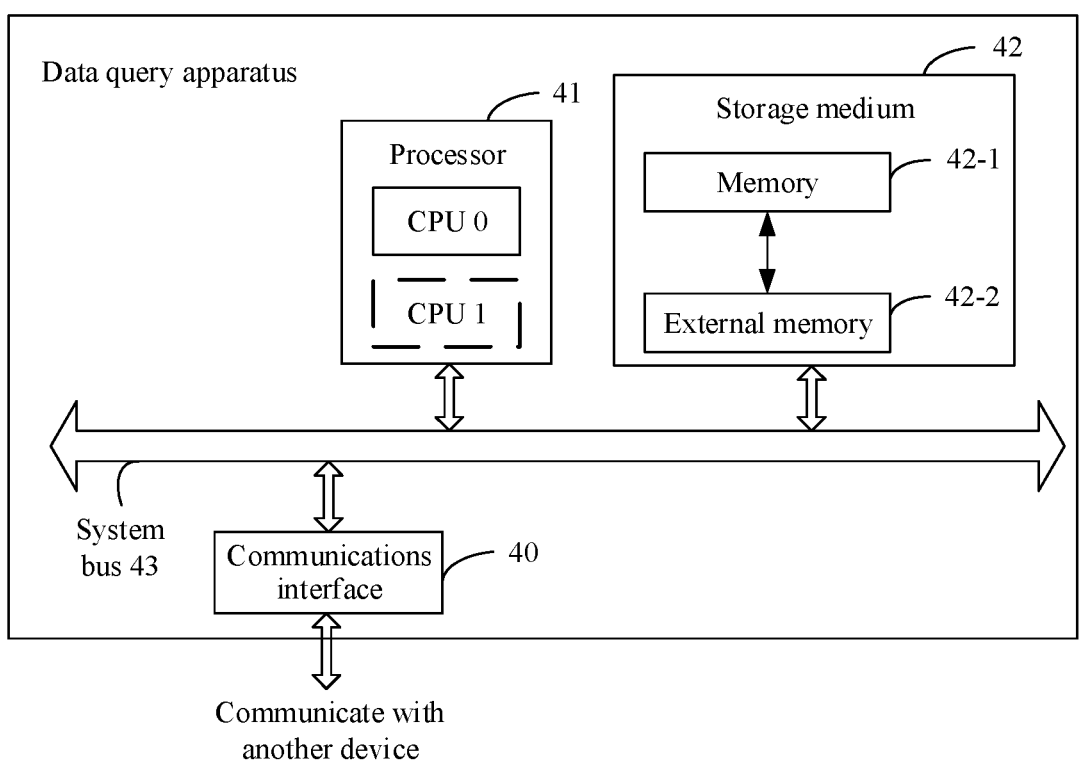
FIG. 4 is a schematic diagram of a hardware structure of a data query apparatus according to an embodiment of this application.

The data query apparatus in this embodiment of this application may be a terminal such as a computer, a mobile phone, or a tablet computer. FIG. 4 is a schematic diagram of a structure of a data query apparatus according to an embodiment of this application. Referring to FIG. 4, the data query apparatus includes a communications interface 40, a processor 41, and a storage medium 42. The communications interface 40, the processor 41, and the storage medium 42 are connected to each other by using a system bus 44, and implement mutual communication.

The communications interface 40 is configured to communicate with another device, for example, share data of a file with the another device.

The storage medium 42 may be configured to store data of a directory file, may be configured to store data of a common file, or may be configured to store a software program and an application module. The processor 41 runs the software program and the application module that are stored in the storage medium 42, to execute various functional applications of the data query apparatus.

The storage medium 42 includes a memory 42-1 and an external memory 42-2. The memory 42-1 is configured to temporarily store operation data of the processor 41, data exchanged with the external memory 42-2, and the like. The external memory 42-2 are configured to store data of an application program, a directory file, and a common file. In this embodiment of this application, the directory file includes n (n≥1) directory blocks. Each directory block includes a directory entry area and a file name area. The directory entry area includes at least one directory entry. The file name area includes at least one file name. A quantity of directory entries is the same as a quantity of file names in a same directory block. All directory entries and all file names are sequentially arranged according to a preset rule in the same directory block. Quantities of directory entries in different directory blocks may be the same, or may be different. For a detailed description of the directory block, refer to descriptions below. Details are not described herein. In this implementation of this application, an operating system may be a Windows operating system, or may be a Linux operating system.

In this embodiment of this application, the external memory 42-2 is a nonvolatile memory, for example, at least one magnetic disk storage device, an electrically erasable programmable read-only memory (Electrically Erasable Programmable Read-Only Memory, EEPROM), and a flash memory device, for example, a NOR flash memory (NOR flash memory), or a NAND flash memory (NAND flash memory). The nonvolatile memory stores the operating system and the application program executed by the processor 41. The processor 41 may load a running program and data from the nonvolatile memory to the memory 42-1, and store data content in a storage device specially used for storage.

The storage medium 42 may exist independently, and is connected to the processor 41 by using the system bus 44. The memory 42 may also be integrated into the processor 41.

The processor 41 is a control center of the data query apparatus. The processor 41 is connected to various parts of the entire data query apparatus by using various interfaces and lines, and runs or executes the software program and/or the application module stored in the storage medium 42, and invokes the data stored in the storage medium 42 to perform various functions of the storage device and processes data, to monitor the entire data query apparatus.

The processor 41 may include only a central processing unit (Central Processing Unit, CPU), or may be a combination of a CPU, a digital signal processor (Digital Signal Processor, DSP), and a control chip in a communications unit. In this implementation of this application, the CPU may be a single computing core, or may include a plurality of computing cores. In a specific implementation, in an embodiment, the processor 41 may include one or more CPUs. For example, the processor 41 in FIG. 4 includes a CPU 0 and a CPU 1.

The system bus 44 may be a circuit that interconnects the foregoing elements and transfers communication between the foregoing elements. For example, the system bus 44 is an industrial standard architecture (Industry Standard Architecture, ISA) bus, a peripheral component interconnect (Peripheral Component Interconnect, PCI) bus, an extended industry standard architecture (Extended Industry Standard Architecture, EISA) bus, or an advanced microcontroller bus architecture (Advanced Microcontroller Bus Architecture, AMBA). The system bus 44 may be classified into an address bus, a data bus, a control bus, and the like. In this embodiment of this application, for clear description, various buses in FIG. 4 are all illustrated as the system bus 44.

It should be noted that the data query method provided in this embodiment of this application is applied to an application scenario in which a file system of the data query apparatus is a read-only file system.

To facilitate understanding of the data query method provided in this embodiment of this application, a structure of a directory stored in the external memory 42-2 of the data query apparatus in this embodiment of this application is first described.

In the external memory 42-2 of the data query apparatus in this embodiment of this application, each partition includes a super area, an index area, and a data area. For the super area, the index area, and the data area, refer to the description of the structure shown in FIG. 2. Details are not described herein again.

Same as the structure shown in FIG. 2, a directory file in the data area in this embodiment of this application also includes n directory blocks. A difference lies in that in this embodiment of this application, each of the n directory blocks includes a directory entry area and a file name area, the directory entry area includes a plurality of directory entries (m directory entries are used as an example for description, and m≥1), the file name area includes a plurality of file names (m file names are used as an example for description), the m directory entries one-to-one correspond to the m file names, and the m directory entries and the m file names are all sequentially arranged according to a preset rule. Because the directory entry one-to-one corresponds to the file name, a directory entry records a store address of a file name corresponding to the directory entry.

It should be noted that quantities of directory entries included in different directory blocks may be the same, or may be different. This is not specifically limited in this embodiment of this application.

The directory entry in this embodiment of this application is slightly different from an existing directory entry. The existing directory entry includes information such as a file name, an index number, and a file type. The directory entry in this embodiment of this application includes information such as an index number, a file type, and an offset of a file name in the directory block, but does not include a file name. For example, for a common file ABC whose index number is S1, the existing directory entry corresponding to the file name "ABC" includes information such as S1, ABC, and a common file type. In this embodiment of this application, the file name of the file is stored in the file name area. If the offset of the file in the directory block is 32, the directory entry corresponding to the file name "ABC" in this embodiment of this application includes information such as S1, 32, and the common file type.

For ease of description, all directory entries in content described below indicate directory entries that do not include the file name.

Because a length of the file name is variable, in this embodiment of this application, the structure in which the directory entry and the file name are independently stored enables effective utilization of storage space of the data query apparatus. This effectively improves the utilization of the storage space of the data query apparatus.

In this embodiment of this application, the file name area is located after and adjacent to the directory entry area. Therefore, an offset of a file name in the directory block, included in a first directory entry in the directory entry area, is used to indicate a store address of the first file name, and an end of the directory entry area. Because sizes of the directory entries in the same directory block are the same, when the first directory entry is used to indicate the end of the directory entry area, a data obtaining apparatus can calculate the quantity of directory entries.

Figure 5:
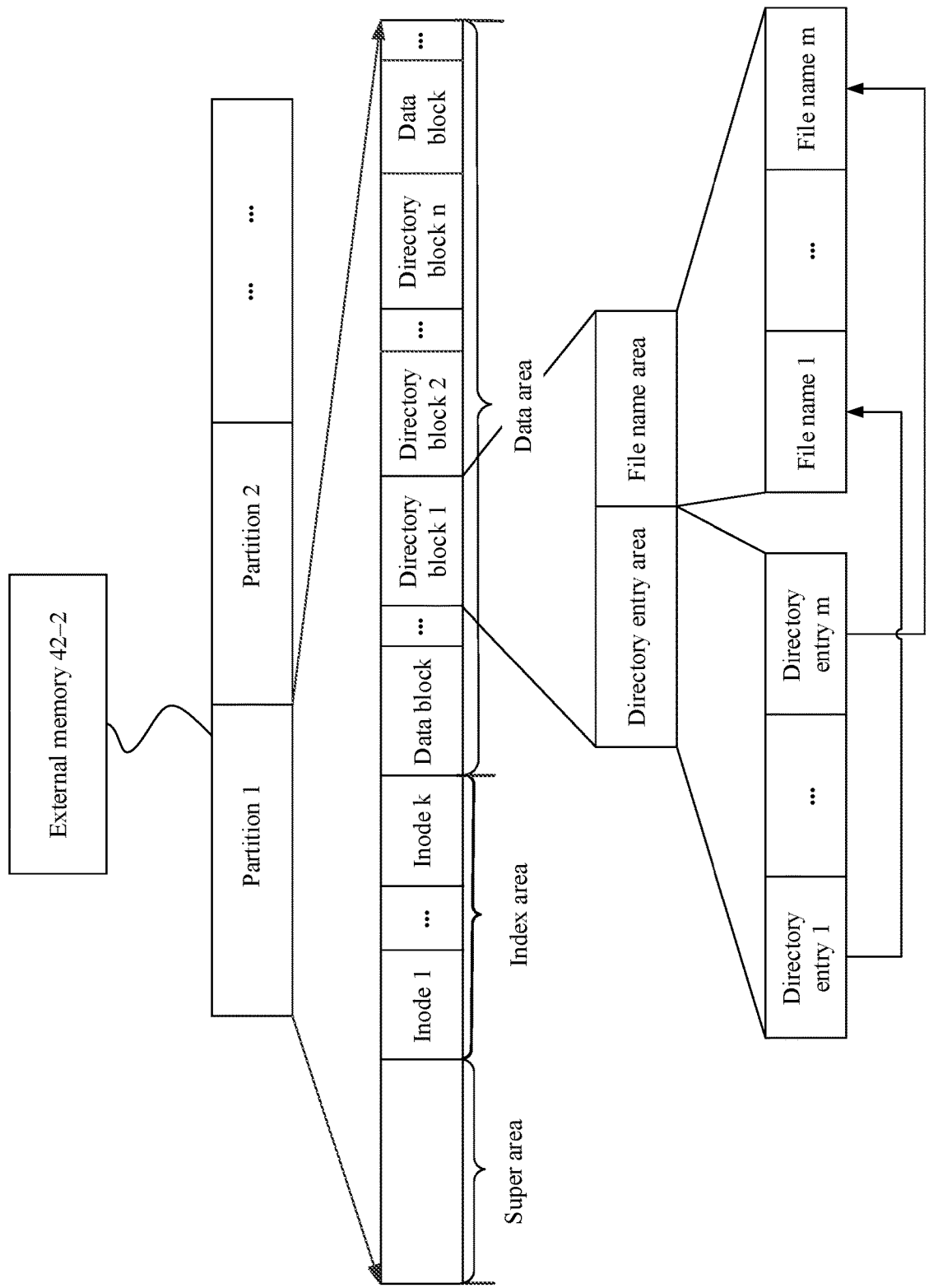
FIG. 5 is a schematic diagram of a partition structure of an external memory 42-2 of a data query apparatus according to an embodiment of this application.

In an example, FIG. 5 shows a partition structure of the storage medium 42 of the data query apparatus according to this embodiment of this application. The data area includes n directory blocks (a directory block 1, a directory block 2, . . . , and a directory block n). Each directory block includes a directory entry area and a file name area. A directory entry area of the directory block 1 includes m directory entries (a directory entry 1, a directory entry 2, . . . , and a directory entry m). A file name area of the directory block 1 includes m file names (a file name 1, a file name 2, . . . , and a file name m). The directory entry 1 includes a storage location of the file name 1, the directory entry 2 includes a storage location of the file name 2, . . . , and the directory entry m includes a storage location of the file name m. The data obtaining apparatus can calculate, based on the storage location of the file name 1 and a starting location of the directory block, that a quantity of directory entries in the directory block 1 is m.

Figure 6:
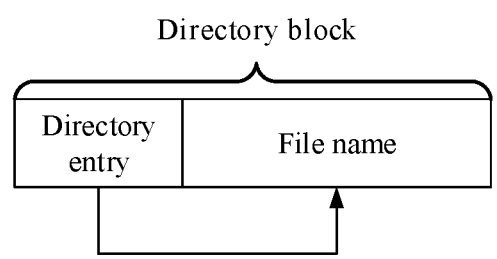
FIG. 6 is a schematic diagram of structural distribution of a directory block of a data query apparatus according to an embodiment of this application.

Because the length of the file name is variable, a quantity of directory entries included in one directory block is not specified. Particularly, if a file name of a file A is comparatively long, the directory block may include only one directory entry and the file name of the file A. FIG. 6 shows a directory block including only one directory entry and one file name.

Optionally, if storage space of a directory block in this embodiment of this application is insufficient to store the file name. The file name may be stored in a first directory entry of a next directory block of the directory block, or the file name may be stored in a data block, and offset information used to point to the data block is stored in a file name area of the directory block.

In this embodiment of this application, the n directory blocks and all file names in each directory block are sequentially arranged according to the preset rule.

The preset rule may be a lexicographical order, may be a reverse lexicographical order, or may be arranged in another ordered manner. This is not specifically limited in this embodiment of this application.

In each directory block, a directory entry one-to-one corresponds to a file name. Therefore, an arrangement order of all the directory entries in the directory block is the same as an arrangement order of all the file names in the directory block.

For ease of understanding, in the embodiments of this application, an example in which all preset rules described below are the lexicographical order is used for description.

In this embodiment of this application, the n directory blocks may be stored sequentially one by one or stored in a complete binary tree manner between blocks.

Storing sequentially one by one indicates that then directory blocks are sequentially stored according to the preset rule based on the n file names. Each file name in the n file names indicates a file name at a second preset location in a directory block corresponding to the file name.

The file name at the second preset location in the directory block may be a first file name of the directory block, may be a last file name of the directory block, or may be any file name other than a first file name and a last file name in the directory block. This is not specifically limited in this embodiment of this application.

For ease of understanding, an example in which the file name at the second preset location in the directory block is the first file name of the directory block or the last file name of the directory block is used for description below.

Figure 7:
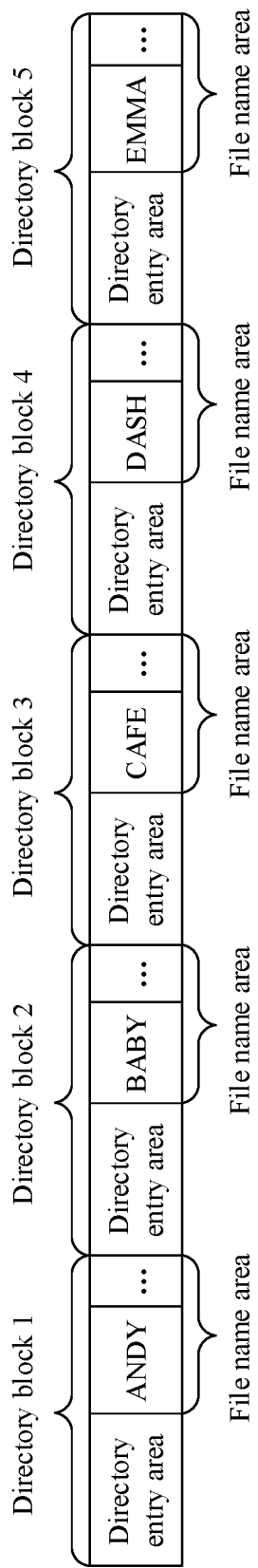
FIG. 7 is a schematic diagram 1 of an arrangement structure of directory blocks of a data query apparatus according to an embodiment of this application.

For example, as shown in FIG. 7, the first file names in the directory blocks included in the data query apparatus are ANDY, BABY, CAFE, DASH, and EMMA, and are arranged in the lexicographical order. The arrangement order of the five file names is sequentially ANDY, BABY, CAFE, DASH, and EMMA. Therefore, in the data query apparatus, a directory block 1 is a directory block whose first file name is ANDY, a directory block 2 is a directory block whose first file name is BABY, a directory block 3 is a directory block whose first file name is CAFE, a directory block 4 is a directory block whose first file name is DASH, and a directory block 5 is a directory block whose first file name is EMMA.

Storing between blocks in the complete binary tree manner indicates that the n directory blocks are stored in the complete binary tree manner. In this embodiment of this application, the n directory blocks are arranged according to the preset rule based on a file name at a fourth preset location in each directory block.

The file name at the fourth preset location in the directory block may be a first file name of the directory block, may be a last file name of the directory block, or may be any file name other than a first file name and a last file name in the directory block. This is not specifically limited in this embodiment of this application.

Figure 8:
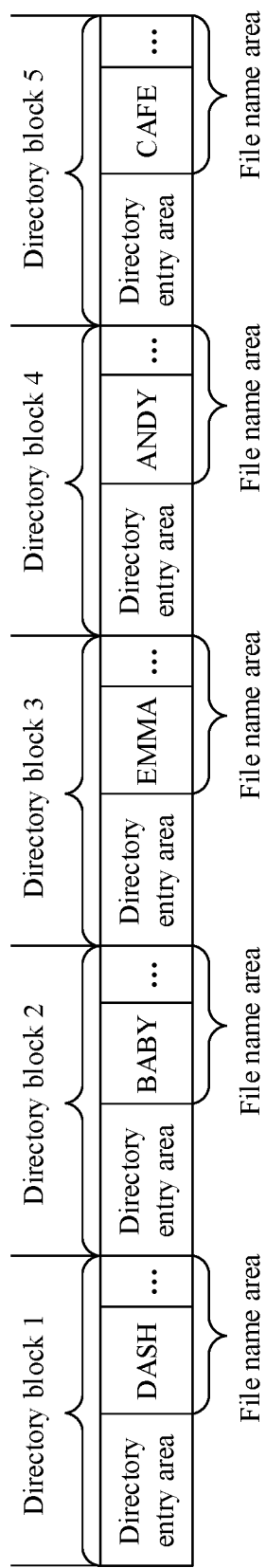
FIG. 8 is a schematic diagram 2 of an arrangement structure of directory blocks of a data query apparatus according to an embodiment of this application.

For example, as shown in FIG. 8, the file name at the fourth preset location in the directory blocks is the first file name in the directory block. The first file names in the directory blocks included in the data query apparatus are ANDY, BABY, CAFE, DASH, and EMMA, and are arranged in the lexicographical order. The arrangement order of the five file names is sequentially ANDY, BABY, CAFE, DASH, and EMMA. After the five file names are stored in the complete binary tree manner, the arrangement order of the five file names is sequentially DASH, BABY, EMMA, ANDY, and CAFE. Correspondingly, in the data query apparatus, a directory block 1 is a directory block whose first file name is DASH, a directory block 2 is a directory block whose first file name is BABY, a directory block 3 is a directory block whose first file name is EMMA, a directory block 4 is a directory block whose first file name is ANDY, and a directory block 5 is a directory block whose first file name is CAFE.

An example in which the n directory blocks are stored sequentially one by one is used to describe a data query method provided in this application. Specifically, detailed descriptions are provided with reference to the schematic diagram of the structure of the data query apparatus shown in FIG. 4, the partition structure of the storage medium 42 of the data query apparatus shown in FIG. 5, and the schematic diagram of the structure of the directory block in the data query apparatus shown in FIG. 7.

Figure 9:
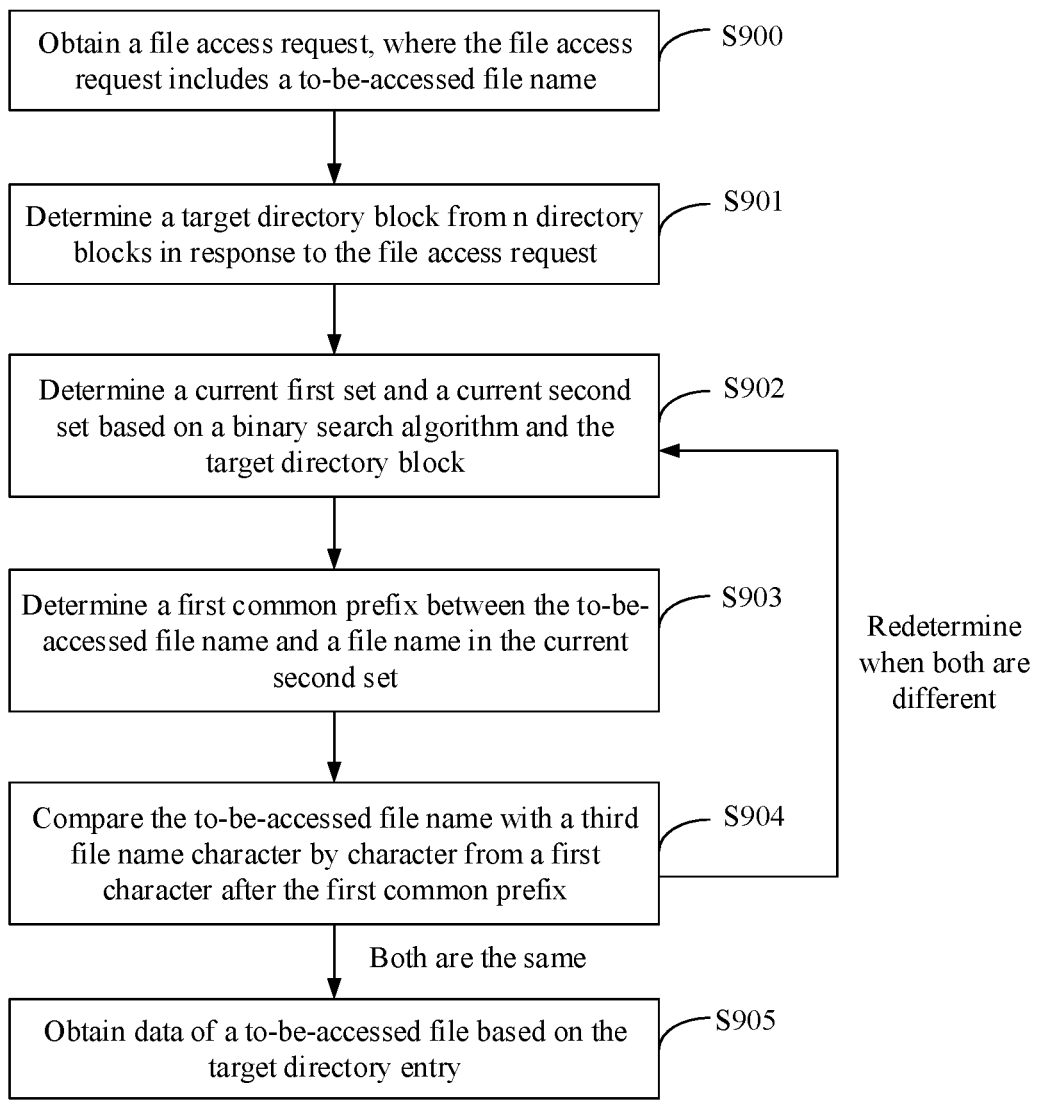
FIG. 9 is a schematic flowchart of a data query method according to an embodiment of this application.

Specifically, refer to FIG. 9. FIG. 9 is a schematic flowchart of a data query method according to an embodiment of this application.

As shown in FIG. 9, the data query method provided in this embodiment of this application specifically includes the following steps.

S900: A data query apparatus obtains a file access request, where the file access request includes a to-be-accessed file name.

Optionally, an application program on the data query apparatus triggers a command in a running process for obtaining a to-be-accessed file. In this embodiment of this application, names of the to-be-accessed files are collectively referred to as the to-be-accessed file name. The command for obtaining the to-be-accessed file is also referred to as the file access request, and the file access request includes the to-be-accessed file name.

For example, if the application program on the data query apparatus triggers a command "file*fp; fp=("file a")" in the running process, the data query apparatus obtains an access request of a file a.

S901: The data query apparatus determines a target directory block from the n directory blocks in response to the file access request.

It can be learned with reference to the foregoing descriptions that the data query apparatus in this embodiment of this application includes n directory blocks. Each directory block includes a directory entry area and a file name area. The directory entry area includes at least one directory entry. The file name area includes at least one file name.

In this embodiment of this application, the file names in each directory block are sequentially arranged according to the preset rule. Therefore, a file name range may include the file names in each directory block.

For example, with reference to FIG. 7, if the directory block 1 includes three file names ANDY, APPLE, and ATTENT, the file name range including the file names in the directory block 1 is [ANDY, ATTENT].

After obtaining the file access request, the data query apparatus needs to first determine that the to-be-accessed file name specifically falls within a file name range including a file name of a directory block, and further search the determined directory block for the to-be-accessed file name.

Specifically, the data query apparatus in this embodiment of this application determines the target directory block from the n directory blocks. In other words, the to-be-accessed file name falls within the file name range including the file name of the target directory block.

It is easy to understand that the to-be-accessed file name falls within the file name range including the file name of the target directory block, but the to-be-accessed file name may not belong to a file name included in the target directory block. In other words, the target directory block may include the to-be-accessed file name.

With reference to the foregoing example, the directory block 1 includes the three file names ANDY, APPLE, and ATTENT, and the file name range including the file names in the directory block 1 is [ANDY, ATTENT]. A to-be-accessed file name ANGEL falls within the file name range [ANDY, ATTENT], but the to-be-accessed file name ANGEL is not a file name included in the directory block 1.

In this embodiment of this application, the directory entry area of the target directory block includes m directory entries, the file name area of the target directory block includes m file names, and the m directory entries one-to-one correspond to the m file names. The directory entry includes information such as the index number, the file type, and the offset of the file name in the directory block.

Specifically, a method for determining the target directory block by the data query apparatus is as follows.

A step A2 is that the data query apparatus determines a current third set and a current fourth set based on a binary search algorithm and the n directory blocks. The current third set includes p file names. The p file names include file names at a second preset location in each of p directory blocks. The p file names are sequentially arranged according to the preset rule. The p directory blocks are consecutive directory blocks in the n directory blocks. The current fourth set includes the p file names, a fourth file name, and a fifth file name. The fourth file name is a file name arranged before and adjacent to a first file name in the p file names. The fifth file name is a file name arranged after and adjacent to a last file name in the p file names, where $1 \leq p \leq n$.

A step B2 is determining a second common prefix between the to-be-accessed file name and a file name in the current fourth set.

A step C2 is Comparing the to-be-accessed file name with a sixth file name character by character from a first character after the second common prefix, where the sixth file name is a file name at a third preset location in the current third set.

If the to-be-accessed file name is the same as the sixth file name, the data query apparatus determines a directory block to which the sixth file name belongs as the target directory block.

It can be learned from the definition of the set that a file name range including the file name of the current fourth set is greater than a file name range including a file name of the current third set, and the current fourth set includes the fourth file name and the fifth file name. Particularly, when p=n, the fourth file name and the fifth file name are null.

Because the file name range including the file name of the current fourth set is greater than the file name range including the file name of the current third set, the file name in the current third set also has the second common prefix between the to-be-accessed file name and the file names of the current fourth set. After determining the second common prefix, the data query apparatus may compare the to-be-accessed file name with the sixth file name character by character from the first character after the second common prefix, to improve query efficiency.

It is easily understood that, when the fourth file name and the fifth file name are null, the second common prefix is initialized to be null.

Specifically, a method for determining, by the data query apparatus, the second common prefix between the to-be-accessed file name and the file name in the current fourth set is that the data query apparatus determines a third prefix shared by the to-be-accessed file name and the fourth file name, and determines a fourth prefix shared by the to-be-accessed file name and the fifth file name, and then the data query apparatus determines one with a shorter length between the third prefix and the fourth prefix as the second common prefix.

In an example, with reference to FIG. 7, it is assumed that the current fourth set is (ANDY, BABY, CAFE, DASH, EMMA), the current third set is (BABY, CAFE, DASH), the fourth file name is ANDY, and the fifth file name is EMMA. If the to-be-accessed file name is CORE, the data query apparatus determines that the third prefix and the fourth prefix are null. Finally, the data query apparatus determines that the second common prefix is null.

In another example, it is assumed that the current fourth set is (A, AC, ACB, ACD, AD, B, C), and the current third set is (AC, ACB, ACD, AD, B). If the to-be-accessed file name is ACC, the fourth file name is A, and the fifth file name is C, the data query apparatus determines that the third prefix is A and the fourth prefix is null. Finally, the data query apparatus determines that the second common prefix is null.

The sixth file name is a file name at a third preset location in the current third set. The file name at the third preset location may be a $\lfloor (1+p)/2 \rfloor^{th}$ file name in the current third set, or may be a file name at another location in the current third set. This is not specifically limited in this embodiment of this application.

After comparing the to-be-accessed file name with the sixth file name character by character, the data query apparatus may determine whether the to-be-accessed file name is the same as the sixth file name.

If the to-be-accessed file name is the same as the sixth file name, the data query apparatus determines the directory block to which the sixth file name belongs as the target directory block. Optionally, if the to-be-accessed file name is the same as the sixth file name, the data query apparatus may not need to redetermine the target directory block. The data query apparatus may directly determine, based on the sixth file name, a directory entry corresponding to the to-be-accessed file name, and further obtain data of the to-be-accessed file based on the directory entry corresponding to the to-be-accessed file name.

Because a process in which the data query apparatus directly finds, in a process of determining the target directory block, a file name that is the same as the to-be-accessed file name is comparatively simple, this case is not described in detail in this embodiment of this application.

If the to-be-accessed file name is different from the sixth file name, and when $2 \leq p \leq n$, the data query apparatus redetermines a third set and a fourth set based on the current third set, the current fourth set, and the binary search algorithm, and performs the step B2 and the step C2 based on the redetermined third set and the redetermined fourth set.

With reference to the foregoing description of the binary search, it can be learned that the redetermined third set includes all file names in the current third set that are arranged before or after the sixth file name.

Specifically, if a feature value of the to-be-accessed file name is greater than a feature value of the sixth file name, the redetermined third set includes all the file names in the current third set that are arranged after the sixth file name. If a feature value of the to-be-accessed file name is less than a feature value of the sixth file name, the redetermined third set includes all the file names in the current third set that are arranged before the sixth file name.

For example, with reference to FIG. 7, it is assumed that the file names included in the current third set are ANDY, BABY, CAFE, DASH, and EMMA in FIG. 7, and the sixth file name is CAFE. If the to-be-accessed file name is ANDY, file names included in the redetermined third set are ANDY and BABY. If the to-be-accessed file name is DASH, file names included in the redetermined third set are DASH and EMMA.

The data query apparatus performs the step B2 based on the redetermined fourth set, to redetermine the second common prefix.

In an example, it is assumed that the current fourth set is (A, AC, ACB, ACD, AD, B, C), and the current third set is (AC, ACB, ACD, AD, B). If the to-be-accessed file name is ACC, the sixth file name is ACD, the fourth file name is A, and the fifth file name is C, the data query apparatus determines that the current second common prefix is null (the current third prefix is A, and the current fourth prefix is null. Therefore, the current second common prefix is null). The data query apparatus compares the to-be-accessed file name ACC with the file name ACD character by character from the first character of the current second common prefix. Because the feature value of the to-be-accessed file name ACC is less than the feature value of the file name ACD, the data query apparatus redetermines the third set and the fourth set. The redetermined third set is (AC, ACB), and the redetermined fourth set is (A, AC, ACB, ACD). The data query apparatus redetermines the second common prefix based on the re-determined fourth set. A fourth file name in the redetermined fourth set is A, and a fifth file name in the redetermined fourth set is ACD. Therefore, in a process of redetermining the second common prefix, the third prefix is A, the fourth prefix is AC, and the data query apparatus determines one with a shorter length between A and AC is the second common prefix. To be specific, the second common prefix redetermined by the data query apparatus is A.

If the to-be-accessed file name is different from the sixth file name, when p=1, the data query apparatus determines the target directory block based on a file name included in the current third set. Specifically, when a file name at the second preset location is a first file name of the directory block, and if the feature value of the to-be-accessed file name is greater than a feature value of the file name in the current third set, the data query apparatus determines a directory block to which the file name in the current third set belongs as the target directory block. If the feature value of the to-be-accessed file name is less than a feature value of the file name in the current third set, the data query apparatus determines a directory block to which a file name located before and adjacent to the file name in the current third set belongs as the target directory block.

In an example, each file name is a first file name in a corresponding directory block. If the current third set includes nine file names A, B, C, D, E, F, G, H, and I, the sixth file name is E, and the to-be-accessed file name is EA, the process in which the data query apparatus determines the target directory block is as follows: ①. The second common prefix is null, and the data query apparatus compares the to-be-accessed file name EA with the sixth file name E character by character from the first character based on the second common prefix. Because the feature value of the to-be-accessed file name EA is greater than a feature value of the file name E, the data query apparatus redetermines that the third set is (F, G, H, I). ②. The third set redetermined by the data query apparatus is (F, G, H, I) in the step ①. Therefore, the current third set in this step is (F, G, H, I). If the sixth file name is a $\lfloor (1+q)/2 \rfloor^{th}$ file name in the current third set, the sixth file name is G, and the second common prefix in this step is null. The data query apparatus compares the to-be-accessed file name EA with the file name G character by character from the first character based on the second common prefix. Because the feature value of the to-be-accessed file name EA is less than the feature value of the file name G, the data query apparatus redetermines that the third set is (F) and the redetermined fourth set is (E, F, G). ③. In the step ②, the third set redetermined by the data query apparatus is (F), and the redetermined fourth set is (E, F, G). Therefore, in this step, the current third set is (F), the current fourth set is (E, F, G), and the second common prefix determined by the data query apparatus based on (E, F, G) is null. The data query apparatus compares the to-be-accessed file name EA with the file name F character by character from the first character based on the current second common prefix. Because the current third set includes only one file name F, and the feature value of the to-be-accessed file name EA is less than the feature value of F, the target directory block is the directory block to which a file name E located before and adjacent to F belongs.

Figure 10:
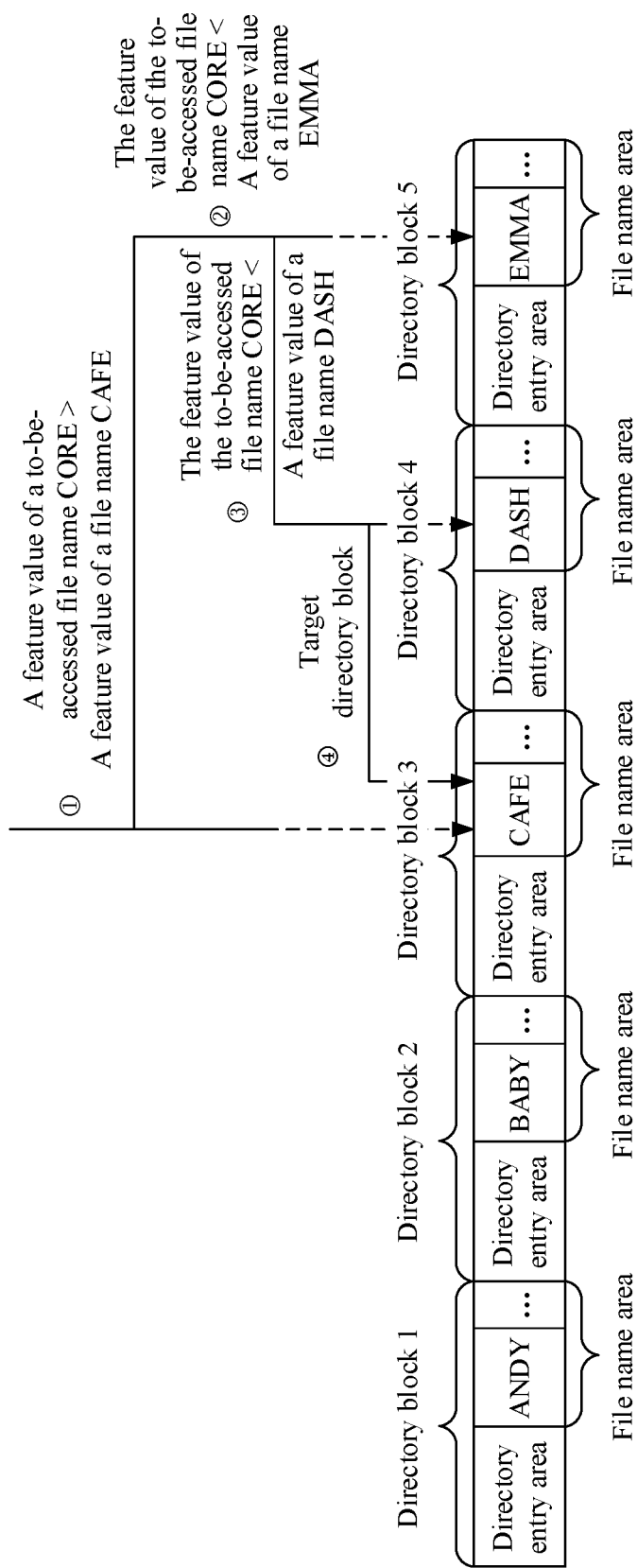
FIG. 10 is a schematic flowchart 1 of determining a target directory block by a data query apparatus according to an embodiment of this application.

In another example, with reference to FIG. 7, as shown in FIG. 10, if the current third set is (ANDY, BABY, CAFE, DASH, EMMA), and the to-be-accessed file name is CORE, the process in which the data query apparatus determines the target directory block is as follows: ①. In this case, the fourth file name and the fifth file name are null, and the second common prefix is null. If the sixth file name is CAFE, the data query apparatus compares the to-be-accessed file name CORE with the file name CAFE character by character from the first character based on the third common prefix. Because the feature value of the to-be-accessed file name CORE is greater than the feature value of the file name CAFE, the data query apparatus redetermines that the third set is (DASH, EMMA), and redetermines that the second common prefix is null (the third prefix shared by the to-be-accessed file name CORE and the file name CAFE is "C". A fourth prefix shared by the to-be-accessed file name CORE and the fifth file name is null. Therefore, the redetermined second common prefix is null). ②. The third set redetermined by the data query apparatus is (DASH, EMMA) in the step ①. Therefore, the current third set is (DASH, EMMA) in this step. If the sixth file name is EMMA, the data query apparatus compares the to-be-accessed file name CORE with the file name EMMA character by character from the first character based on the current second common prefix. ③. Because the feature value of the to-be-accessed file name CORE is less than the feature value of the file name EMMA, the data query apparatus redetermines that the third set is (DASH), and redetermines that the second common prefix is null. In this case, the current third set is (DASH), the current second common prefix is null, and the data query apparatus compares the to-be-accessed file name CORE with the file name DASH character by character from the first character based on the current second common prefix. Because the current third set includes only one file name DASH, and the feature value of the to-be-accessed file name CORE is less than the feature value of the file name DASH, the data query apparatus determines that the target directory block is the directory block to which the file name CAFE located before and adjacent to DASH belongs. ④. The data query apparatus determines that the target directory block is a directory block 3.

In an example, each file name is a first file name in a corresponding directory block. If the current third set is (A, AC, ACB, ACD, AD, B, C), the fourth file name and the fifth file name are null, the sixth file name is ACD, and the to-be-accessed file name is ACC, the process in which the data query apparatus determines the target directory block is as follows: ①. Because the fourth file name and the fifth file name are null, the current second common prefix is null. The data query apparatus compares the to-be-accessed file name ACC with the sixth file name ACD character by character from the first character based on the second common prefix. Because the feature value of the to-be-accessed file name ACC is less than the feature value of the file name ACD, the data query apparatus redetermines that the third set is (A, AC, ACB), and redetermines that the fourth set is (null, A, AC, ACB, ACD). ②. The third set redetermined by the data query apparatus is (A, AC, ACB) in the step ②. Therefore, the current third set is (A, AC, ACB) in step ②. If the sixth file name is a $\lfloor (1+q)/2 \rfloor^{th}$ file name in the current third set, the sixth file name is AC. The redetermined fourth set is (null, A, AC, ACB, ACD) in the step ①. Therefore, the current fourth set is (null, A, AC, ACB, ACD) in step ②. The fourth file name in the current fourth set is null, and the fifth file name in the current fourth set is ACD. Correspondingly, the current third prefix is null, and the current fourth prefix is AC. Therefore, the second common prefix redetermined by the data query apparatus is null. The data query apparatus compares the to-be-accessed file name ACC with the file name AC character by character from the first character based on the second common prefix. Because the feature value of the to-be-accessed file name ACC is greater than the feature value of the file name AC, the data query apparatus redetermines that the third set is (ACB) and the redetermined fourth set is (AC, ACB, ACD). ①. In the step ②, the third set redetermined by the data query apparatus is (ACB), and the fourth set redetermined by the data query apparatus is (AC, ACB, ACD). Therefore, the current third set is (ACB), and the current fourth set is (AC, ACB, ACD) in the step ③. A fourth file name in the current fourth set is AC. Therefore, the third prefix is "AC". A fifth file name in the current fourth set is ACD. Therefore, the fourth prefix is "AC". The data query apparatus uses one with a shorter length between the third prefix "AC" and the fourth prefix "AC" as the second common prefix. Therefore, the current second common prefix is "AC". The data query apparatus compares the to-be-accessed file name ACC with the file name ACB character with character from the first character after "AC" of the second common prefix. Because the current third set includes only one file name ACB, and the feature value of the to-be-accessed file name ACC is greater than the feature value of ACB, the target directory block is the directory block to which the ACB belongs.

Particularly, when the file name at the second preset location is the first file name in the directory block, and the file name at the third preset location is the first file name in the current third set, namely, the sixth file name is the first file name in the current third set, and if the feature value of the to-be-accessed file name is less than the feature value of the sixth file name, regardless of whether a value of p is greater than 1, the data query apparatus determines the directory block to which a file name located before and adjacent to the sixth file name belongs as the target directory block.

In an example, with reference to FIG. 7, if the current third set is (ANDY, BABY, CAFE, DASH, EMMA), and the to-be-accessed file name is CORE, the process in which the data query apparatus determines the target directory block is as follows: ①. In this case, the fourth file name and the fifth file name are null, and the second common prefix is null. If the sixth file name is CAFE, the data query apparatus compares the to-be-accessed file name CORE with the file name CAFE character by character from the first character based on the third common prefix. Because the feature value of the to-be-accessed file name CORE is greater than the feature value of the file name CAFE, the data query apparatus redetermines that the third set is (DASH, EMMA), and redetermines that the second common prefix is null (the third prefix shared by the to-be-accessed file name CORE and the file name CAFE is "C", and the fourth prefix shared by the to-be-accessed file name CORE and the fifth file name is null. Therefore, the redetermined second common prefix is null). ②. The third set redetermined by the data query apparatus is (DASH, EMMA) in the step ①. Therefore, in this step, the current third set is (DASH, EMMA). If the sixth file name is DASH, the data query apparatus compares the to-be-accessed file name CORE with the file name DASH character by character from the first character based on the current second common prefix. ③. Because the feature value of the to-be-accessed file name CORE is less than the feature value of the file name DASH, the data query apparatus determines that the target directory block is the directory block to which the file name CAFE located before and adjacent to DASH belongs. In other words, the data query apparatus determines that the target directory block is the directory block 3.

When the file name at the second preset location is the first file name in the directory block, and the file name at the third preset location is a last file name in the current third set, namely, the sixth file name is the last file name in the current third set, and if the feature value of the to-be-accessed file name is greater than the feature value of the sixth file name, the data query apparatus determines the directory block to which the sixth file name belongs as the target directory block.

In an example, with reference to FIG. 7, if the current third set is (ANDY, BABY, CAFE, DASH, EMMA), the to-be-accessed file name is END, and the sixth file name is the last file name EMMA in the current third set, because the feature value of the to-be-accessed file name END is greater than the feature value of the file name EMMA, the data query apparatus determines that the directory block to which the file name EMMA belongs is the target directory block.

Optionally, in a scenario in which the n directory blocks are stored sequentially one by one, if the sixth file name is the $\lfloor(1+p)/2\rfloor^{th}$ file name in the current third set, and for each directory block, if the file name at the second preset location is the first file name in the directory block, pseudo code used by the data query apparatus in this embodiment of this application to determine the target directory block may be the following code:

```
{
    (headprefix, endprefix) ← (0, 0) // Initial values of both headprefix
and endprefix are 0. //
    left ←0
    right ← blocks−1 // A quantity of directory blocks is blocks,
and an initialized query closed interval is [0, blocks−1]. //
    while left≤right do //Perform the following operations in the closed
interval. //
        mid ← (left+right)/2 // Determine a file name at a middle
location of the query closed interval. //
        commonprefix ← min (headprefix, endprefix) // A common
prefix is a smaller one between headprefix and endprefix. //
        (ret, matched) ← prefixstrcmp (fname, dirent0name[mid],
commonprefix) // Compare a to-be-accessed file name fname and the file
name dirent0name[mid] at the middle location of the query closed
interval character by character from a first character of the common
prefix, and determine a shared prefix between the two file names. //
            if ret=0 then
                return mid
                break //If fname is the same as dirent0name[mid],
determine the directory block at the middle location as a target directory
block, return an identifier of the directory block at the middle location,
and exit. //
            else
                if ret>0 then
                    left← mid+1
                    headprefix ← matched // If a feature value of fname is
greater than a feature value of dirent0name (mid), update the query closed
interval to [mid+1, blocks−1] to adapt to headprefix. //
                else
                    right← mid−1
                    endprefix ← matched //If the feature value of fname is
less than the feature value of dirent0name[mid], update the query closed
interval to [0, mid−1], and adaptively update headprefix. //
                end if
            end if
        end while
        return left−1 //Return an identifier of a directory block at a location
left−1. //
}
```

In the code, headprefix is the third prefix, endprefix is the fourth prefix, and the query closed interval is equivalent to the third set.

It can be learned that, before the target directory block is determined, the query closed interval of the data query apparatus is continuously narrowed. In each query closed interval, the data query apparatus compares, from the first character after the common prefix, the to-be-accessed file name fname with the file name dirent0name[mid] located at the middle location of the query closed interval character by character. This effectively improves a rate of querying the target directory block.

After determining the target directory block in step S901, the data query apparatus searches the target directory block for a file name that is the same as the to-be-accessed file name. In this embodiment of this application, a directory entry corresponding to the to-be-accessed file name is referred to as the target directory entry. After finding the file name that is the same as the to-be-accessed file name, the data query apparatus may determine the target directory entry, and further obtain data of the to-be-accessed file based on the target directory entry.

Specifically, after performing the step S901, the data query apparatus performs a step S902, and performs steps below in sequence.

S902: The data query apparatus determines a current first set and a current second set based on the binary search algorithm and the target directory block.

The current first set includes x consecutive file names in the m file names, and the current second set includes the x file names, a first file name, and a second file name, where m≥x≥1. The first file name is a file name arranged before and adjacent to a first file name in the x file names, and the second file name is a file name arranged after and adjacent to a last file name in the x file names.

The target directory block includes the m file names, and the data query apparatus queries the m file names in the target directory block based on the binary search algorithm.

Specifically, the data query apparatus determines, based on the binary search algorithm and the target directory block, the current first set including the x file names and the current second set including the x file names, the first file names, and the second file names.

It can be learned from the description of the binary search and the procedure shown in FIG. 1 that, the query interval of the data query apparatus is continuously narrowed in the query process, and in each query interval, the data query apparatus needs to compare the feature value of the to-be-accessed file name with a feature value of the file name at the middle location of the query interval. For ease of description, in this embodiment of this application, an example in which the current query interval is the current first set is used for description.

Particularly, if x=m, the first file name and the second file name are null.

S903: The data query apparatus determines a first common prefix between the to-be-accessed file name and a file name in the current second set.

It can be learned from the descriptions of the current first set and the current second set that a file name range including all file names in the current second set is greater than a file name range including all file names in the current first set. Therefore, all the file names in the current first set have the first common prefix.

It is easily understood that, when the first file name and the second file name are null, the first common prefix is initialized to be null.

Specifically, a method for determining the first common prefix by the data query apparatus is that the data query apparatus determines a first prefix shared by the to-be-accessed file name and the first file name, and determines a second prefix shared by the to-be-accessed file name and the second file name, and the data query apparatus determines that one with a shorter length between the first prefix and the second prefix is the first common prefix.

Figure 11:
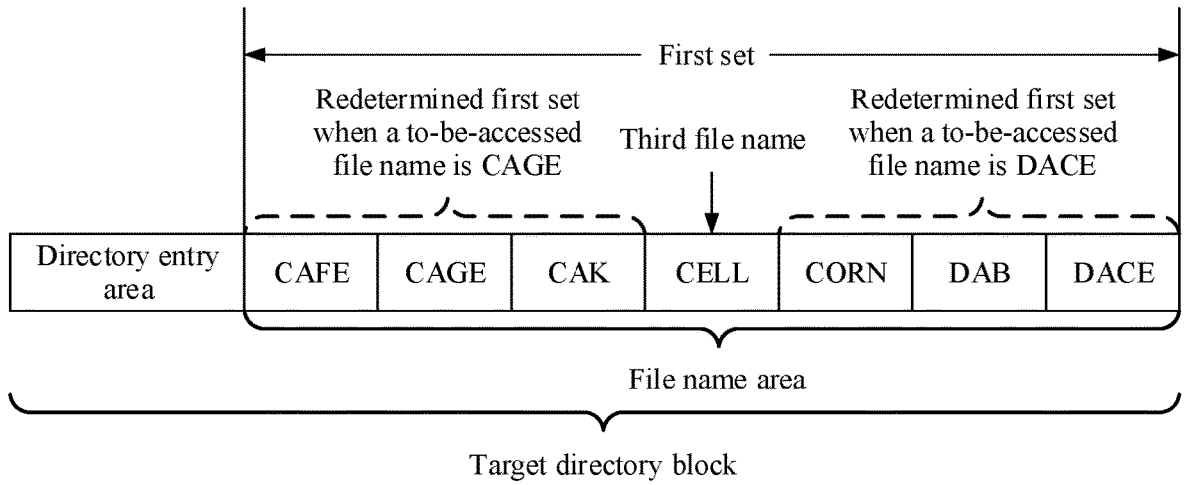
FIG. 11 is a schematic flowchart 2 of determining a target directory block by a data query apparatus according to an embodiment of this application.

In an example, as shown in FIG. 11, the target directory block includes seven file names arranged in sequence: CAFE, CAGE, CAK, CELL, CORN, DAB, and DACE. If the current first set is (CAFE, CAGE, CAK, CELL, CORN, DAB, DACE), both the first file name and the second file name are null, the third file name is CELL, and the to-be-accessed file name is CAK, because both the first file name and the second file name are null, both the first prefix and the second prefix are null. Correspondingly, the current first common prefix is null.

If the current first set is (CAFE, CAGE, CAK), the first file name is null, the second file name is CELL, the first prefix shared between the first file name and the to-be-accessed file name CAK is null, and the second prefix shared between the to-be-accessed file name CAK and the second file name CELL is "C". A length of the first prefix is less than a length of the second prefix. Therefore, the current first common prefix is null.

S904: The data query apparatus compares, from a first character after the first common prefix, the to-be-accessed file name with a third file name character by character.

The third file name is a file name at a first preset location in the current first set.

Optionally, the file name at the first preset location may be a $\lfloor (1+x)/2 \rfloor^{th}$ file name in the current first set, or may be a file name at another location in the current first set. This is not specifically limited in this embodiment of this application.

Because all the file names in the current first set have the first common prefix, after determining the first common prefix, the data query apparatus compares, from the first character after the first common prefix, the to-be-accessed file name with the third file name character by character. This improves a rate of searching by the data query apparatus for the file name that is the same as the to-be-accessed file name.

After comparing the to-be-accessed file name with the third file name character by character, the data query apparatus may determine whether the to-be-accessed file name is the same as the third file name.

If the to-be-accessed file name is the same as the third file name, it indicates that a file corresponding to the third file name is the to-be-accessed file. In this case, the target directory entry is a directory entry corresponding to the third file name. The data query apparatus may obtain the data of the to-be-accessed file based on the target directory entry. In this case, after performing step S904, the data query apparatus continues to perform the following step S905.

If the to-be-accessed file name is different from the third file name, the data query apparatus needs to determine a value relationship between the feature value of the to-be-accessed file name and a feature value of the third file name, further redetermine a first set and a second set based on the value relationship, and perform the step B1 and the step C1 based on the redetermined first set and the redetermined second set, until the data of the to-be-accessed file is obtained or that the target directory block does not include the to-be-accessed file name is determined.

Specifically, if the feature value of the to-be-accessed file name is less than the feature value of the third file name, the first set redetermined by the data query apparatus includes all file names in the current first set that are located before the third file name. If the feature value of the to-be-accessed file name is greater than the feature value of the third file name, the first set redetermined by the data query apparatus includes all file names in the current first set that are located after the third file name.

For example, with reference to FIG. 11, it is assumed that the first set is (CAFE, CAGE, CAK, CELL, CORN, DAB, DACE), and the third file name is CELL. If the to-be-accessed file name is DACE, the feature value of the to-be-accessed file name DACE is greater than the feature value of the third file name CELL. The redetermined first set is (CORN, DAB, DACE). If the to-be-accessed file name is CAGE, the feature value of the to-be-accessed file name CAGE is less than the feature value of the third file name CELL. The redetermined first set is (CAFE, CAGE, CAK).

Correspondingly, if the feature value of the to-be-accessed file name is less than the feature value of the third file name, the redetermined second set redetermined by the data query apparatus includes a first file name, all the file names in the current first set that are located before the third file name, and the third file name.

If the feature value of the to-be-accessed file name is greater than the feature value of the third file name, the second set redetermined by the data query apparatus includes the third file name, all the file names in the current first set that are located after the third file name, and a second file name.

S905: The data query apparatus obtains the data of the to-be-accessed file based on the target directory entry.

Specifically, the data query apparatus obtains an index number of the to-be-accessed file from the target directory entry, and obtains an index of the to-be-accessed file based on the index number of the to-be-accessed file, and further, the data query apparatus can obtain the data of the to-be-accessed file based on the index of the to-be-accessed file.

A process in which the data query apparatus searches the target directory block for the file name that is the same as the to-be-accessed file name is described with reference to a specific example.

Figure 12:
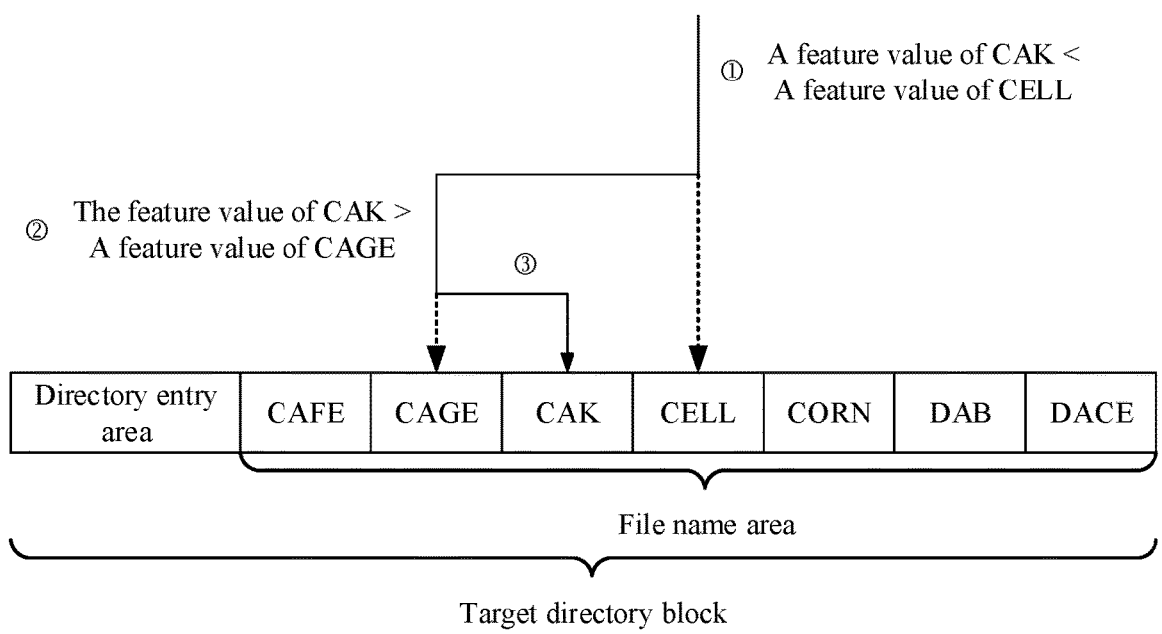
FIG. 12 is a schematic diagram of a structure of a second set according to an embodiment of this application.

In an example, with reference to FIG. 11, as shown in FIG. 12, the current first set is (CAFE, CAGE, CAK, CELL, CORN, DAB, DACE), the third file name is CELL, both the first file name and the second file name are null, and the to-be-accessed file name is CAK. A process in which the data query apparatus queries the to-be-accessed file name is as follows: ①. In this case, the first common prefix is initialized to be null, and the data query apparatus compares the to-be-accessed file name CAK with the file name CELL character by character based on the first common prefix. Because the feature value of the to-be-accessed file name CAK is less than the feature value of the file name CELL, the data query apparatus redetermines that the first set is (CAFE, CAGE, CAK), and redetermines that the first file name in the second set is null, and the second file name is CELL. Therefore, the redetermined first common prefix is null (The second prefix shared by the to-be-accessed file name CAK and the file name CELL is "C", and the first prefix shared by the to-be-accessed file name CAK and the first file name is null. Therefore, the redetermined first common prefix is null.). ②. The first set redetermined in step ① is (CAFE, CAGE, CAK). Therefore, the current first set in step ② is (CAFE, CAGE, CAK). Correspondingly, the current first common prefix is null. If the third file name is CAGE, the data query apparatus compares the to-be-accessed file name CAK with the file name CAGE character by character based on the current first common prefix. Because the feature value of the to-be-accessed file name CAK is greater than the feature value of the file name CAGE, the data query apparatus redetermines that the first set is (CAK), redetermines that the second set is (CAGE, CAK, CELL). ③. The first set redetermined in step ② is (CAK), and the second set redetermined is (CAGE, CAK, CELL). Therefore, the current first set in step ③ is (CAK), and the current second set is (CAGE, CAK, CELL). The data query apparatus determines that the current first common prefix is "C", and the data query apparatus, from a first character after "C", compares the to-be-accessed file name CAK with the file name CAK in the current first set character by character. Because the file name CAK in the current first set is the same as the to-be-accessed file name CAK, the data query apparatus determines that the target directory entry is the directory entry corresponding to CAK. Further, the data query apparatus obtains the data of the to-be-accessed file based on the target directory entry.

Optionally, in this embodiment of this application, pseudo code used by the data query apparatus to query the to-be-accessed file name in the target directory block may be the following code:

```
{
    found ← nil //Assign a null pointer to a finally determined file name found. //
    (headprefix, endprefix) ← (0, 0) // Initial values of both headprefix and endprefix are 0. //
    left ←0
    right ← ndirents−1 // A quantity of directory entries is ndirents, and an initialized query closed interval is [0, ndirents−1]. //
    while left≤right do //Perform the following operations in the closed interval. //
        mid ← (left+right)/2 // Determine a file name at a middle location of the query closed interval. //
        commonprefix ← min (headprefix, endprefix) // A common prefix is a smaller one between headprefix and endprefix. //
        (ret, matched) ← prefixstrcmp (fname, direntname[mid], commonprefix) // Compare a to-be-accessed file name fname and the file name direntname[mid] at the middle location of the query closed interval character by character from a first character of the common prefix, and determine a shared prefix between the two file names. //
        if ret=0 then
            found ←direntname[mid]
            break //If fname is the same as direntname[mid], determine the final file name is the file name at the middle location, return the file name at the middle location, and exit. //
        else
            if ret>0 then
                left← mid+1
                headprefix ← matched // If a feature value of fname is greater than a feature value of direntname (mid), update the query interval to [mid+1, ndirents−1], and adaptively update to headprefix. //
            else
                right← mid−1
                endprefix ← matched // If the feature value of fname is less than the feature value of direntname[mid], update the query interval to [0, mid−1], and adaptively update headprefix. //
            end if
        end if
    end while
    return found //Return found. //
}
```

In the code, headprefix is the first prefix, endprefix is the second prefix, fname is the to-be-accessed file name, and the query closed interval is equivalent to the first set.

It can be learned that, before the file name that is the same as the to-be-accessed file name is found, the query interval of the data query apparatus is continuously narrowed. In each query interval, the data query apparatus compares, from the first character after the common prefix, the to-be-accessed file name fname with the file name direntname [mid] located at the middle location of the query interval character by character. This effectively improves a query rate.

In this embodiment of this application, when the n directory blocks are stored between blocks in the complete binary tree manner, a procedure of the data query method provided in this embodiment of this application is still the procedure shown in FIG. 9, and the data query apparatus may alternatively perform steps S900 to S905. However, in a scenario in which the n directory blocks are stored between the blocks in the complete binary tree manner and a scenario in which the n directory blocks are stored sequentially one by one, methods for which the data query apparatus determines the target directory block from the n directory blocks are different.

Now, a method for determining the target directory block from the n directory blocks by the data query apparatus in the scenario in which the n directory blocks are stored between the blocks in the complete binary tree manner is explained.

Specifically, in the scenario in which the n directory blocks are stored between the blocks in the complete binary tree manner, the method for determining the target directory block by the data query apparatus is as follows.

A step A3 is that the data query apparatus determines a current candidate directory block and a current third common prefix.

A step B3 is that the data query apparatus compares the to-be-accessed file name with an $i^{th}$ file name character by character from a first character after the current third common prefix, where the $i^{th}$ file name is a file name at a fourth preset location in an $i^{th}$ directory block in the n directory blocks, and 0≤i<n.

If the to-be-accessed file name is the same as the $i^{th}$ file name, the data query apparatus redetermines the candidate directory block as a directory block to which the $i^{th}$ file name belongs, and determines the redetermined candidate directory block as the target directory block.

The $i^{th}$ file name is the file name at the fourth preset location in the $i^{th}$ directory block in the n directory blocks. The file name at the fourth preset location may be a first file name in a corresponding directory block, may be a last file name in a corresponding directory block, or may be another file name in a corresponding directory block. This is not specifically limited in this embodiment of this application.

After comparing the to-be-accessed file name with the $i^{th}$ file name character by character from the first character after the current third common prefix, the data query apparatus may determine whether the to-be-accessed file name is the same as the $i^{th}$ file name.

If the to-be-accessed file name is the same as the $i^{th}$ file name, it indicates that the directory block to which the $i^{th}$ file name belongs is the target directory block. In this case, the data query apparatus may directly determine, based on the $i^{th}$ file name, a directory entry corresponding to the to-be-accessed file name, and further obtain the data of the to-be-accessed file based on the directory entry corresponding to the to-be-accessed file name.

If the to-be-accessed file name is different from the $i^{th}$ file name, the data query apparatus redetermines the third common prefix, the candidate directory block, and the $i^{th}$ file name, and re-performs the step B3 based on the redetermined third common prefix, the redetermined candidate directory block, and the redetermined $i^{th}$ file name until the target directory block is determined.

The redetermined $i^{th}$ file name is a file name at a fourth preset location in a $j^{th}$ directory block in the n directory blocks. If the feature value of the to-be-accessed file name is greater than a feature value of the $i^{th}$ file name, j=2i+2, or if the feature value of the to-be-accessed file name is less than a feature value of the $i^{th}$ file name, j=2i+1, and $0 \leq i < j < n$.

Similar to the method for determining the common prefix by the data query apparatus in the scenario in which the n directory blocks are stored sequentially one by one, the data query apparatus also determines a common prefix in the scenario in which the n directory blocks are stored between the blocks in the complete binary tree manner.

In the scenario in which the n directory blocks are stored between the blocks in the complete binary tree manner, the data query apparatus determines the third common prefix.

If the file name at the fourth preset location is the first file name in the corresponding directory block, a method for redetermining the third common prefix by the data query apparatus is that when the feature value of the to-be-accessed file name is greater than the feature value of the $i^{th}$ file name, the data query apparatus updates a current first target prefix to a prefix shared by the to-be-accessed file name and the $i^{th}$ file name, and determines, one with a shorter length between the updated first target prefix and the current second target prefix as the redetermined third common prefix, or when the feature value of the to-be-accessed file name is less than the feature value of the $i^{th}$ file name, the data query apparatus updates a current second target prefix to a prefix shared by the to-be-accessed file name and the $i^{th}$ file name, and determines one with a shorter length between a current first target prefix and the updated second target prefix as the redetermined third common prefix.

Initial values of both a length of the first target prefix and a length of the second target prefix are zero, and the length of the first target prefix and the length of the second target prefix change with a value relationship between the feature value of the to-be-accessed file name and the feature value of the $i^{th}$ file name.

In addition, when the file name at the fourth preset location is the first file name in the corresponding directory block, a method for redetermining the candidate directory block by the data query apparatus is that if the feature value of the to-be-accessed file name is greater than the feature value of the $i^{th}$ file name, the data query apparatus determines that the candidate directory block is a directory block to which the $i^{th}$ file name belongs; or if the feature value of the to-be-accessed file name is less than the feature value of the $i^{th}$ file name, the data query apparatus determines that the candidate directory block is the same as the current candidate directory block.

It is easily understood that if i=0, the current candidate directory block is null, and the current third common prefix is null.

A process in which the data query apparatus searches the target directory block for a file name that is the same as the to-be-accessed file name in the scenario in which the n directory blocks are stored between the blocks in the complete binary tree manner is described with reference to a specific example.

Figure 13:
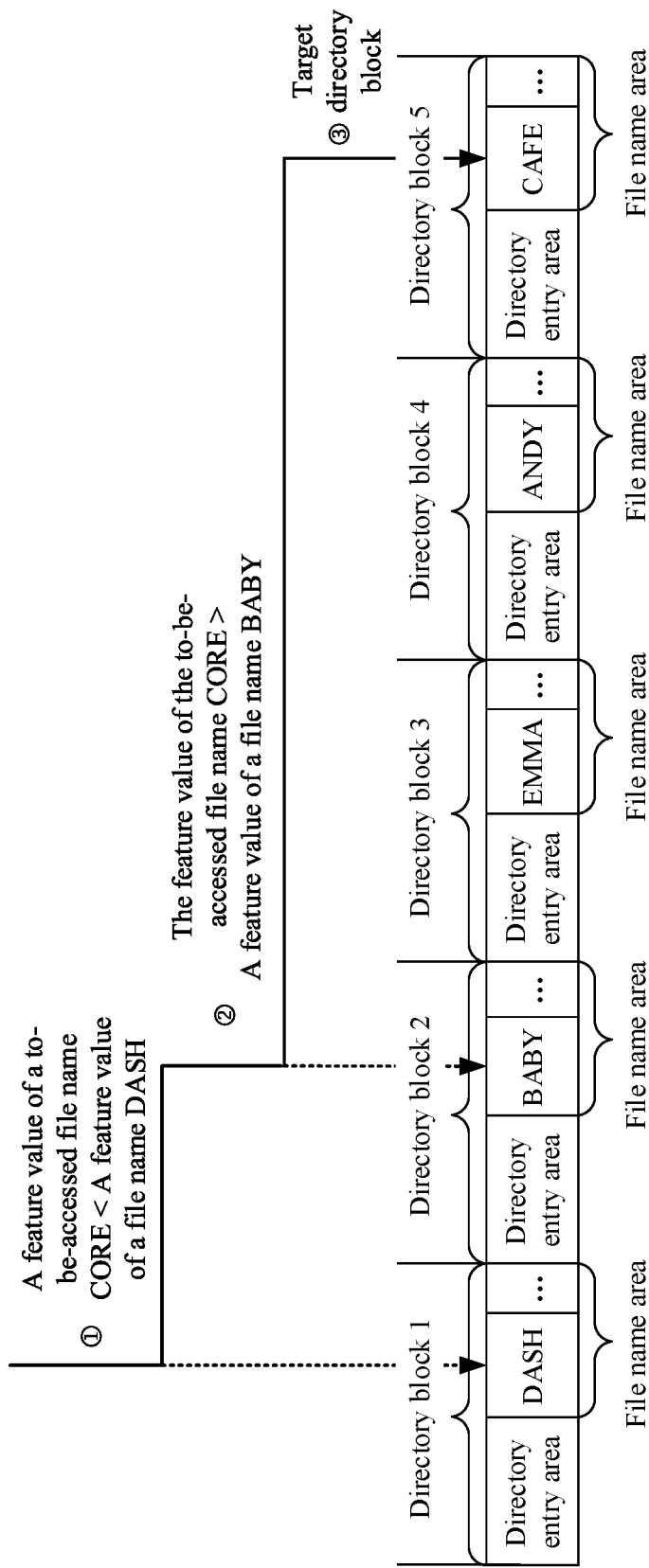
FIG. 13 is a schematic flowchart 1 of querying a to-be-accessed file name by a data query apparatus according to an embodiment of this application.

For example, with reference to FIG. 8, as shown in FIG. 13, if the to-be-accessed file name is CORE, a process in which the data query apparatus determines the target directory block is as follows: ①. An initial value of the candidate directory block is null, and an initial value of the third common prefix is null, and the data query apparatus compares the to-be-accessed file name CORE with a $0^{th}$ file name DASH character by character from the first character. Because the feature value of the to-be-accessed file name CORE is less than the feature value of the DASH, the data query apparatus needs to further compare the to-be-accessed file name CORE with a first (2*0+1) file name BABY. The third common prefix redetermined by the data query apparatus is still null. In this case, the candidate directory block remains unchanged and is still null. ②. The data query apparatus compares the to-be-accessed file name CORE with a first file name BABY character by character from the first character. Because the feature value of the to-be-accessed file name CORE is greater than the feature value of the BABY, the data query apparatus changes the candidate directory block to a directory block (namely, a directory block 2) to which BABY belongs. The query apparatus needs to further compare the to-be-accessed file name CORE with a fourth (2*1+2) file name CAFE. The third common prefix redetermined by the data query apparatus is still null. ③. The data query apparatus compares the to-be-accessed file name CORE with a fourth file name CAFE character by character from the first character. Because the feature value of the to-be-accessed file name CORE is greater than the feature value of CAFE, the data query apparatus replaces the candidate directory block with the directory block (namely, a directory block 5) to which CAFE belongs. In addition, the data query apparatus needs to further compare the to-be-accessed file name with a tenth (2*4+2) file name. However, the tenth file name does not exist. Therefore, the data query apparatus determines that the directory block to which CAFE belongs is the target directory block. In other words, the data query apparatus determines that the target directory block is the directory block 5.

Optionally, for each directory block in the scenario in which the n directory blocks are stored between the blocks in the complete binary tree manner, if the file name at the fourth preset location is the first file name in the directory block, pseudo code used by the data query apparatus in this embodiment of this application to determine the target directory block may be the following code:

---

```
{
    candidate ← -1 // An initial value of a candidate directory block
candidate is null. //
    (headprefix, endprefix) ← (0, 0) // Initial values of both headprefix
and endprefix are 0. //
    i ← 0 // Query from an i^th file name. //
```

```
    while i < nblocks do // Perform the following operations when i is
less than a quantity of directory blocks. //
        commonprefix ← min (headprefix, endprefix) // A common
prefix is a smaller one between headprefix and endprefix. //
        (ret, matched) ← prefixstrcmp (fname, dirent0name[i],
commonprefix) // Compare a to-be-accessed file name fname with the i$^{th}$
file name dirent0name[i] character by character from a first character after
the common prefix, and determine a prefix shared by the two file names. //
        if ret=0 then
            candidate ← i
            break // If fname is the same as dirent0name[i],
determine the i$^{th}$ directory block as a target directory block, return an
identifier of the i$^{th}$ directory block, and exit. //
        else
            if ret>0 then
                candidate ← i
                i ← i*2+2
                headprefix ← matched // If a feature value of fname is
greater than a feature value of dirent0name[i], update the i$^{th}$ file name
to an (i*2+2)$^{th}$ file name, and update the candidate directory block
candidate to the i$^{th}$ directory block, and adaptively update headprefix. //
            else
                i ← i*2+1
                endprefix ← matched //If the feature value of fname is
less than the feature value of dirent0name[i], update the i$^{th}$ file name to
an (i*2+1)$^{th}$ file name, and adaptively update endprefix. //
            end if
        end if
    end while
    return candidate //Return candidate. //
}
```

In the code, headprefix is equivalent to the first target prefix, and endprefix is equivalent to the second target prefix.

It can be learned that the data query apparatus compares the to-be-accessed file name fname with the i$^{th}$ file name dirent0name[i] character by character from the first character after the common prefix. This effectively improves a rate of querying the target directory block.

In conclusion, regardless of whether the n directory blocks are stored sequentially one by one or the n directory blocks are stored between the blocks in the complete binary tree manner, the data query method provided in this embodiment of this application can effectively improve a rate of querying the to-be-accessed file.

An embodiment of this application provides a data query apparatus. The data query apparatus is configured to perform the steps performed by the data query apparatus in the foregoing data query method. The data query apparatus provided in this embodiment of this application may include modules corresponding to corresponding steps.

In this embodiment of this application, function modules of the data query apparatus may be divided based on the foregoing method examples. For example, each function module may be obtained through division based on a corresponding function, or two or more functions may be integrated into one processing module. The integrated module may be implemented in a form of hardware, or may be implemented in a form of a software function module. In this embodiment of this application, division into the modules is an example, and is merely logical function division. In an actual implementation, another division manner may be used.

Figure 14:
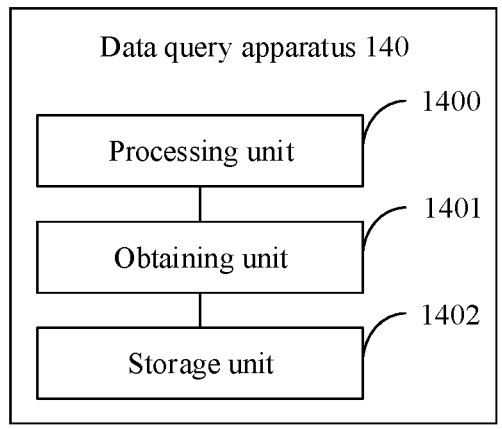
FIG. 14 is a schematic diagram 1 of a structure of a data query apparatus according to an embodiment of this application.

If division into the function module is performed based on the corresponding function, FIG. 14 shows a schematic diagram of a possible structure of the data query apparatus according to the foregoing embodiments. As shown in FIG. 14, the data query apparatus 140 includes a processing unit 1400 and an obtaining unit 1401.

The processing unit 1400 is configured to support the data query apparatus 10 in performing steps S901, S902, S903, S904, and the like in the foregoing embodiment, and/or is configured to perform another process of the technology described in this specification.

The obtaining unit 1401 is configured to support the data query apparatus 10 in performing steps S900, S905, and the like in the foregoing embodiment, and/or is configured to perform another process of the technology described in this specification.

All related content of the steps in the foregoing method embodiments may be cited in function descriptions of the corresponding function modules. Details are not described herein again.

Certainly, the data query apparatus 140 provided in this embodiment of this application includes but is not limited to the foregoing modules. For example, the data query apparatus may further include a storage unit 1402.

The storage unit 1402 may be configured to store program code and data of the data query apparatus 140.

Figure 15:
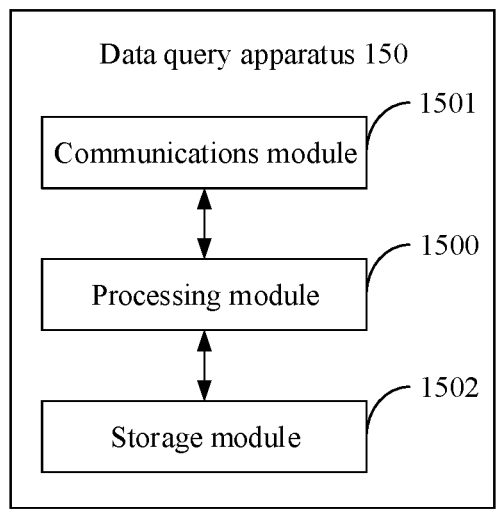
FIG. 15 is a schematic diagram 2 of a structure of a data query apparatus according to an embodiment of this application.

When the integrated unit is used, a schematic diagram of a structure of the data query apparatus according to this embodiment of this application is shown in FIG. 15. In FIG. 15, the data query apparatus 150 includes a processing module 1500 and a communications module 1501. The processing module 1500 is configured to control and manage an operation of the data query apparatus 150, for example, perform the steps performed by the processing unit 1400, and/or is configured to perform another process of the technology described in this specification. The communications module 1501 is configured to support the data query apparatus 150 in interacting with another device, for example, perform the steps performed by the obtaining unit 1401. As shown in FIG. 15, the data query apparatus 150 may further include a storage module 1502. The storage module 1502 is configured to store program code and data of the data query apparatus 150, for example, store content stored by the storage unit 1402.

The processing module 1500 may be a processor or a controller, for example, may be a CPU, a general purpose processor, a DSP, an application-specific integrated circuit (Application-Specific Integrated Circuit, ASIC), a field programmable gate array (Field Programmable Gate Array, FPGA), another programmable logic component, a transistor logic device, a hardware component, or any combination thereof. The processing module 1500 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 1501 may be a transceiver, an RF circuit, a communications interface, or the like. The storage module 1502 may be a memory.

With reference to FIG. 4, the processing module 1500 may be the processor 41 in FIG. 4, the communications module 1501 may be the communications interface 40 in FIG. 4, and the storage module 1502 may be the storage medium 42 in FIG. 2.

All related content of the scenarios in the foregoing method embodiments may be cited in function descriptions of the corresponding function modules. Details are not described herein again.

Both the data query apparatus 140 and the data query apparatus 150 may perform the data query method shown in FIG. 9. The data query apparatus 140 and the data query apparatus 150 may be specifically a terminal.

This application further provides a terminal. The terminal includes one or more processors, a memory, and a communications interface. The memory and the communications interface are coupled to the one or more processors. The memory is configured to store computer program code. The computer program code includes an instruction. When the one or more processors execute the instruction, the terminal performs the data query method in the embodiments of this application.

The terminal may be a video display device, a smartphone, a portable computer, or another device that can process or play a video.

Another embodiment of this application further provides a computer-readable storage medium. The computer-readable storage medium includes one or more pieces of program code. The one or more programs include an instruction. When a processor in a terminal executes the program code, the terminal performs the data query method shown in FIG. 9.

In another embodiment of this application, a computer program product is further provided. The computer program product includes a computer-executable instruction. The computer-executable instruction is stored in a computer-readable storage medium. At least one processor of a terminal may read the computer-executable instruction from the computer-readable storage medium. The at least one processor executes the computer-executable instruction, so that the terminal performs the steps of the data query apparatus in the data query method shown in FIG. 9.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated.

The computer may be a general-purpose computer, a special-purpose computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD), or the like.

According to the foregoing descriptions of the implementations, a person skilled in the art may clearly understand that, for the purpose of convenient and brief description, only division into the foregoing function modules is used as an example for illustration. In an actual application, the foregoing functions can be allocated to different function modules and implemented based on a requirement. In other words, an inner structure of an apparatus is divided into different function modules to implement all or some of the functions described above.

In the several embodiments provided in this application, it should be understood that the disclosed apparatus and method may be implemented in another manner. For example, the described apparatus embodiment is merely an example. For example, division into the module or unit is merely logical function division and may be other division in an actual implementation. For example, a plurality of units or components may be combined or integrated into another apparatus, or some features may be ignored or not performed. In addition, the displayed or discussed mutual couplings, direct couplings, or communication connections may be implemented by using some interfaces. The indirect couplings or the communication connections between apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit. The integrated units may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in a form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes various media that can store program code, such as a USB flash drive, a removable hard disk, a read-only memory (Read-Only Memory, ROM), a random access memory (Random Access Memory, RAM), a magnetic disk, and an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data query method, applied to a read-only file system comprising a processor and n directory blocks, wherein each directory block comprises a directory entry area and a file name area, n≥1, the data query method comprising:

determining, by the processor, a target directory block from the n directory blocks based on a to-be-accessed file name, wherein a directory entry area of the target directory block comprises m directory entries, a file name area of the target directory block comprises m file names, the m directory entries one-to-one correspond to the m file names, the m directory entries and the m file names are all sequentially arranged according to a preset rule, wherein the to-be-accessed file name falls within a file name range, the file name range is a range comprising a first file name of the target directory block and a last file name of the target directory block, and m≥1;

a step A1: determining, by the processor, a current first set and a current second set based on a binary search algorithm and the target directory block, wherein the current first set comprises x consecutive file names in the m file names, the current second set comprises the x file names, a first file name, and a second file name, the first file name is a file name arranged before and adjacent to a first file name in the x file names, the second file name is a file name arranged after and adjacent to a last file name in the x file names, and m≥x≥1;

a step B1: determining, by the processor, a first common prefix between the to-be-accessed file name and a file name in the current second set;

a step C1: comparing, by the processor, the to-be-accessed file name with a third file name character by character from a first character after the first common prefix, wherein the third file name is a file name at a first preset location in the current first set;

in response to the to-be-accessed file name being the same as the third file name, obtaining, by the processor, data of a to-be-accessed file based on a directory entry corresponding to the third file name; and in response to the to-be-accessed file name being different from the third file name, redetermining, by the processor, a first set and a second set based on the binary search algorithm, the current first set, and the current second set, and performing, by the processor, the step B1 and the step C1 based on the redetermined first set and the redetermined second set, until the data of the to-be-accessed file is obtained or the target directory block that does not comprise the to-be-accessed file name is determined.

2. The data query method according to claim 1, wherein the preset rule is a lexicographical order; and in response to the to-be-accessed file name being different from the third file name, the redetermining, by the processor, the first set and the second set based on the binary search algorithm, the current first set, and the current second set comprises:

in response to a feature value of the to-be-accessed file name being less than a feature value of the third file name, determining, by the processor, that the redetermined first set comprises all file names in the current first set that are located before the third file name, and that the redetermined second set comprises the first file name, all the file names in the current first set that are located before the third file name, and the third file name; or, in response to a feature value of the to-be-accessed file name being greater than a feature value of the third file name, determining, by the processor, that the redetermined first set comprises all file names in the current first set that are located after the third file name, and that the redetermined second set comprises the third file name, all the file names in the current first set that are located after the third file name, and the second file name.

3. The data query method according to claim 1, wherein the determining, by the processor, the first common prefix between the to-be-accessed file name and the file name in the current second set comprises:

determining, by the processor, a first prefix shared by the to-be-accessed file name and the first file name;

determining, by the processor, a second prefix shared by the to-be-accessed file name and the second file name; and determining, by the processor, that one with a shorter length between the first prefix and the second prefix is the first common prefix.

4. The data query method according to claim 1, wherein the determining, by the processor, the target directory block from the n directory blocks based on the to-be-accessed file name comprises:

a step A2: determining, by the processor, a current third set and a current fourth set based on the binary search algorithm and the n directory blocks, wherein the current third set comprises p file names, the p file names comprise file names at a second preset location in each of p directory blocks, the file names in the current third set are sequentially arranged according to the preset rule, the p directory blocks are consecutive directory blocks in the n directory blocks, the current fourth set comprises the p file names, a fourth file name, and a fifth file name, the fourth file name is a file name arranged before and adjacent to a first file name in the p file names, the fifth file name is a file name arranged after and adjacent to a last file name in the p file names, and 1≤p≤n;

a step B2: determining, by the processor, a second common prefix between the to-be-accessed file name and a file name in the current fourth set;

a step C2: comparing, by the processor, the to-be-accessed file name with a sixth file name character by character from a first character after the second common prefix, wherein the sixth file name is a file name at a third preset location in the current third set; and in response to the to-be-accessed file name being the same as the sixth file name, determining, by the processor, that a directory block to which the sixth file name belongs is the target directory block.

5. The data query method according to claim 4, wherein in response to the to-be-accessed file name being different from the sixth file name, the data query method further comprises:

in response to 2≤p≤n, redetermining, by the processor, a third set and a fourth set based on the current third set, the current fourth set, and the binary search algorithm, and performing, by the processor, the step B2 and the step C2 based on the redetermined third set and the redetermined fourth set; or in response to p=1, determining, by the processor, the target directory block based on a file name being comprised in the current third set.

6. The data query method according to claim 5, wherein the preset rule is the lexicographical order, and for each directory block, the file name at the second preset location is a first file name of the directory block; and in response to p=1, the determining, by the processor, the target directory block based on the file name being comprised in the current third set comprises:

in response to the feature value of the to-be-accessed file name being greater than a feature value of the file name in the current third set, determining, by the processor, that a directory block to which the file name in the current third set belongs is the target directory block; or in response to the feature value of the to-be-accessed file name being less than a feature value of the file name in the current third set, determining, by the processor, that a directory block to which a file name located before and adjacent to the file name in the current third set belongs is the target directory block.

7. The data query method according to claim 5, wherein the preset rule is the lexicographical order; and
the redetermining, by the processor, the third set and the fourth set based on the current third set, the current fourth set, and the binary search algorithm comprises:
in response to the feature value of the to-be-accessed file name being less than a feature value of the sixth file name, determining, by the processor, that the redetermined third set comprises all file names in the current third set that are located before the sixth file name, and that the redetermined fourth set comprises the fourth file name, all the file names in the current third set that are located before the sixth file name, and the sixth file name; or
in response to the feature value of the to-be-accessed file name being greater than a feature value of the sixth file name, determining, by the processor, that the redetermined third set comprises all file names in the current third set that are located after the sixth file name, and that the redetermined fourth set comprises the sixth file name, all the file names in the current third set that are located after the sixth file name, and the fifth file name.

8. The data query method according to claim 4, wherein the preset rule is the lexicographical order, for each directory block, the file name at the second preset location is the first file name of the directory block, and the data query method further comprises:
in response to the sixth file name being the first file name in the current third set, and the feature value of the to-be-accessed file name being less than a feature value of the sixth file name, determining, by the processor, that a directory block to which a file name located before and adjacent to the sixth file name belongs is the target directory block; or
in response to the sixth file name being the last file name in the current third set, and the feature value of the to-be-accessed file name being greater than a feature value of the sixth file name, determining, by the processor, that a directory block to which the sixth file name belongs is the target directory block.

9. The data query method according to claim 5, wherein the determining, by the processor, the second common prefix between the to-be-accessed file name and the file name in the current fourth set comprises:
determining, by the processor, a third prefix shared by the to-be-accessed file name and the fourth file name;
determining, by the processor, a fourth prefix shared by the to-be-accessed file name and the fifth file name; and
determining, by the processor, that one with a shorter length between the third prefix and the fourth prefix is the second common prefix.

10. The data query method according to claim 1, wherein the n directory blocks are sequentially arranged according to the preset rule, and stored in a complete binary tree manner, and the determining, by the processor, the target directory block from the n directory blocks based on the to-be-accessed file name comprises:
a step A3: determining, by the processor, a current candidate directory block and a current third common prefix;

a step B3: comparing, by the processor, the to-be-accessed file name with an $i^{th}$ file name character by character from a first character after the current third common prefix, wherein the $i^{th}$ file name is a file name at a fourth preset location in an $i^{th}$ directory block in the n directory blocks, and $0 \le i < n$; and
in response to the to-be-accessed file name being the same as the $i^{th}$ file name, redetermining, by the processor, that the candidate directory block is a directory block to which the $i^{th}$ file name belongs, and determining, by the processor, that the redetermined candidate directory block is the target directory block.

11. The data query method according to claim 10, wherein the data query method further comprises:
in response to the to-be-accessed file name being different from the $i^{th}$ file name, redetermining, by the processor, the third common prefix, the candidate directory block, and the $i^{th}$ file name, wherein the redetermined $i^{th}$ file name is a file name at a fourth preset location in a $j^{th}$ directory block in the n directory blocks; and in response to the feature value of the to-be-accessed file name being greater than a feature value of the $i^{th}$ file name, $j=2i+2$; or in response to the feature value of the to-be-accessed file name being less than a feature value of the $i^{th}$ file name, $j=2i+1$, and $0 \le i < j < n$; and
re-performing, by the processor, the step B3 based on the redetermined third common prefix, the redetermined candidate directory block, and the redetermined $i^{th}$ file name until the target directory block is determined.

12. The data query method according to claim 11, wherein the order of the preset rule is the lexicographical order, the file name at the fourth preset location is the first file name in a directory block, and in response to the to-be-accessed file name being different from the $i^{th}$ file name, the redetermining, by the processor, the candidate directory block comprises:
in response to the feature value of the to-be-accessed file name being greater than the feature value of the $i^{th}$ file name, determining, by the processor, that the redetermined candidate directory block is the directory block to which the $i^{th}$ file name belongs; or
in response to the feature value of the to-be-accessed file name being less than the feature value of the $i^{th}$ file name, determining, by the processor, that the redetermined candidate directory block is the current candidate directory block.

13. The data query method according to claim 11, wherein the order of the preset rule is the lexicographical order, the file name at the fourth preset location is the first file name in a directory block, and in response to the to-be-accessed file name being different from the $i^{th}$ file name, the redetermining, by the processor, the third common prefix comprises:
in response to the feature value of the to-be-accessed file name being greater than the feature value of the $i^{th}$ file name, updating, by the processor, a current first target prefix to a prefix shared by the to-be-accessed file name and the $i^{th}$ file name, and determining, by the processor, that one with a shorter length between the updated first target prefix and a current second target prefix is the redetermined third common prefix; or
in response to the feature value of the to-be-accessed file name being less than the feature value of the $i^{th}$ file name, updating, by the processor, a current second target prefix to a prefix shared by the to-be-accessed file name and the $i^{th}$ file name, and determining, by the processor, that one with a shorter length between a current first target prefix and the updated second target prefix is the redetermined third common prefix; wherein initial values of both a length of the first target prefix and a length of the second target prefix are zero, and the length of the first target prefix and the length of the second target prefix change with a value relationship between the feature value of the to-be-accessed file name and the feature value of the $i^{th}$ file name.

14. A system for storing and managing electronic files, comprising:
a non-transitory memory for storing at least one object comprising at least one directory file, the at least one directory file comprising n directory blocks, and each directory block of the n directory blocks comprising a directory entry area for at least one directory entry, and a file name area for at least one file name, and
wherein each directory block of the n directory blocks comprises a same quantity of directory entries and file names, and the directory entries and the file names of each directory block of the n directory blocks are sequentially arranged according to a preset rule, and
wherein the non-transitory memory further stores computer-executable instructions that, when executed by a processor of the read-only file system, cause the processor to:
determine a target directory block from the n directory blocks based on a to-be-accessed file name, wherein a directory entry area of the target directory block comprises m directory entries, a file name area of the target directory block comprises m file names, the m directory entries one-to-one correspond to the m file names, the m directory entries and the m file names are all sequentially arranged according to the preset rule, wherein the to-be-accessed file name falls within a file name range, the file name range is a range comprising a first file name of the target directory block and a last file name of the target directory block, and m≥1;
a step A1: determine a current first set and a current second set based on a binary search algorithm and the target directory block, wherein the current first set comprises x consecutive file names in the m file names, the current second set comprises the x file names, a first file name, and a second file name, the first file name is a file name arranged before and adjacent to a first file name in the x file names, the second file name is a file name arranged after and adjacent to a last file name in the x file names, and m≥x≥1;
a step B1: determine a first common prefix between the to-be-accessed file name and a file name in the current second set;
a step C1: compare the to-be-accessed file name with a third file name character by character from a first character after the first common prefix, wherein the third file name is a file name at a first preset location in the current first set;
in response to the to-be-accessed file name being the same as the third file name, obtain data of a to-be-accessed file based on a directory entry corresponding to the third file name; and
in response to the to-be-accessed file name being different from the third file name, redetermine a first set and a second set based on the binary search algorithm, the current first set, and the current second set, and perform the step B1 and the step C1 based on the redetermined first set and the redetermined second set, until the data of the to-be-accessed file is obtained or the target directory block that does not comprise the to-be-accessed file name is determined.

15. The system according to claim 14, wherein
each of the at least one directory entry comprises an index number, a file type, and an offset of a file name corresponding to the directory entry area in a directory block to which the at least one file name belongs; and
the file name area for the at least one file name is adjacent to and located after the directory entry area.

16. An apparatus for data query, comprising:
a processor; and
a non-transitory memory coupled to the processor and having a read-only file system and processor-executable instructions stored thereon, which when executed by the processor, cause the apparatus to perform:
determining a target directory block for a target file based on the read-only file system,
wherein the read-only file system comprises at least one object comprising at least one directory file, the at least one directory file comprising n directory blocks, and each directory block of the n directory blocks comprising a directory entry area for at least one directory entry, and a file name area for at least one file name, and
wherein each directory block of the n directory blocks comprises a same quantity of directory entries and file names, and the directory entries and the file names of each directory block of the n directory blocks are sequentially arranged according to a preset rule, and
wherein determining a target directory block for a target file based on the read-only file system comprises determining a target directory block from the n directory blocks based on a to-be-accessed file name, wherein a directory entry area of the target directory block comprises m directory entries, a file name area of the target directory block comprises m file names, the m directory entries one-to-one correspond to the m file names, the m directory entries and the m file names are all sequentially arranged according to the preset rule, wherein the to-be-accessed file name falls within a file name range, the file name range is a range comprising a first file name of the target directory block and a last file name of the target directory block, and m≥1, and
wherein the apparatus further performs:
a step A1: determining a current first set and a current second set based on a binary search algorithm and the target directory block, wherein the current first set comprises x consecutive file names in the m file names, the current second set comprises the x file names, a first file name, and a second file name, the first file name is a file name arranged before and adjacent to a first file name in the x file names, the second file name is a file name arranged after and adjacent to a last file name in the x file names, and m≥x≥1;
a step B1: determining a first common prefix between the to-be-accessed file name and a file name in the current second set;
a step C1: comparing the to-be-accessed file name with a third file name character by character from a first character after the first common prefix, wherein the third file name is a file name at a first preset location in the current first set;
in response to the to-be-accessed file name being the same as the third file name, obtaining data of a to-be-accessed file based on a directory entry corresponding to the third file name; and
in response to the to-be-accessed file name being different from the third file name, redetermining a first set and a second set based on the binary search algorithm, the current first set, and the current second set, and performing the step B1 and the step C1 based on the redetermined first set and the redetermined second set, until the data of the to-be-accessed file is obtained or the target directory block that does not comprise the to-be-accessed file name is determined.

17. The apparatus according to claim 16, wherein each of the at least one directory entry comprises an index number, a file type, and an offset of a file name corresponding to the directory entry area in a directory block to which the at least one file name belongs; and the file name area for the at least one file name is adjacent to and located after the directory entry area.

\* \* \* \* \*